US012145359B2

(12) United States Patent
Hamada et al.

(10) Patent No.: US 12,145,359 B2
(45) Date of Patent: Nov. 19, 2024

(54) LIQUID EJECTION APPARATUS AND CONTROL METHOD

(71) Applicant: CANON KABUSHIKI KAISHA, Tokyo (JP)

(72) Inventors: Yoshihiro Hamada, Kanagawa (JP); Tomoki Ishiwata, Kanagawa (JP); So Aizawa, Kanagawa (JP); Keiji Tomizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 17/858,162

(22) Filed: Jul. 6, 2022

(65) Prior Publication Data

US 2023/0007995 A1 Jan. 12, 2023

(30) Foreign Application Priority Data

Jul. 8, 2021 (JP) ................................ 2021-113311

(51) Int. Cl.
*B41J 2/045* (2006.01)
*B41J 2/14* (2006.01)

(52) U.S. Cl.
CPC ......... *B41J 2/04508* (2013.01); *B41J 2/0458* (2013.01); *B41J 2/14072* (2013.01)

(58) Field of Classification Search
CPC .. B41J 2/14129; B41J 2/14072; B41J 2/0458; B41J 2202/12; B41J 2/14024; B41J 2202/20; B41J 2/14145; B41J 2/04541; B41J 2202/19; B41J 2/04508; B41J 2/175
See application file for complete search history.

(56) References Cited

U.S. PATENT DOCUMENTS

| | | | |
|---|---|---|---|
| 5,963,713 | A | 10/1999 | Inose et al. |
| 5,969,730 | A | 10/1999 | Inose et al. |
| 6,068,359 | A | 5/2000 | Inose et al. |
| 6,447,085 | B1 | 9/2002 | Yagi et al. |
| 6,547,367 | B1 | 4/2003 | Hamada |
| 7,556,330 | B2 | 7/2009 | Saito et al. |
| 7,695,088 | B2 | 4/2010 | Yamane et al. |
| 8,287,091 | B2 | 10/2012 | Kyoshima et al. |
| 8,342,631 | B2 | 1/2013 | Kyoshima et al. |
| 8,985,721 | B2 | 3/2015 | Tomizawa et al. |

(Continued)

FOREIGN PATENT DOCUMENTS

| | | | |
|---|---|---|---|
| JP | 2000-246899 | A | 9/2000 |
| JP | 2019-38127 | A | 3/2019 |

*Primary Examiner* — Jannelle M Lebron
(74) *Attorney, Agent, or Firm* — Venable LLP

(57) ABSTRACT

An aspect of the present disclosure is a liquid ejection apparatus including: a liquid ejection head including a conversion element that generates energy required to eject liquid, a first protection layer that blocks contact between the conversion element and the liquid, a second protection layer that partially covers the first protection layer and functions as a first electrode, a second electrode that is electrically connected to the first electrode through the liquid, and an ejection port that ejects the liquid, and a control unit configured to control a potential difference between the first electrode and the second electrode in printing to a predetermined value by changing at least one of potentials of the first electrode and the second electrode. The control unit sets the potential difference based on at least one of a condition and a configuration of the liquid ejection head.

10 Claims, 28 Drawing Sheets

(56) References Cited

U.S. PATENT DOCUMENTS

| | | | |
|---|---|---|---|
| 9,266,325 B2 | 2/2016 | Tomizawa et al. | |
| 9,283,749 B2 | 3/2016 | Hamada et al. | |
| 9,975,347 B2 | 5/2018 | Tozuka et al. | |
| 10,308,018 B2 | 6/2019 | Miura et al. | |
| 10,710,361 B2 | 7/2020 | Misumi et al. | |
| 10,987,921 B2 | 4/2021 | Iwasaki et al. | |
| 2019/0061343 A1 | 2/2019 | Misumi et al. | |
| 2019/0299592 A1* | 10/2019 | Iwasaki | B41J 2/04586 |

* cited by examiner

ΔV CHANGING TABLE

| | POTENTIAL CONTORL REFERENCE VALUE | | | |
|---|---|---|---|---|
| CHANGE FROM REFERENCE TEMPERATURE | 0.5 | 1.0 | 1.5 | 2.0 |
| −2 | 0.8 | 1.3 | 1.8 | 2.2 |
| −1 | 0.65 | 1.15 | 1.65 | 2.05 |
| 0 | 0.5 | 1.0 | 1.5 | 1.9 |
| 1 | 0.35 | 0.82 | 1.35 | 1.75 |
| 2 | 0.2 | 0.7 | 1.2 | 1.6 |
| 3 | 0.05 | 0.55 | 1.05 | 1.45 |

FIG.22

ΔV CHANGING TABLE

| | POTENTIAL CONTORL REFERENCE VALUE | | | |
|---|---|---|---|---|
| DUTY | 0.5 | 1.0 | 1.5 | 2.0 |
| 0% | 0.5 | 1.0 | 1.5 | 2.0 |
| 20% | 0.45 | 0.95 | 1.45 | 1.95 |
| 40% | 0.4 | 0.9 | 1.4 | 1.9 |
| 60% | 0.35 | 0.85 | 1.35 | 1.85 |
| 80% | 0.30 | 0.8 | 1.3 | 1.8 |
| 100% | 0.25 | 0.75 | 1.25 | 1.75 |

FIG.24

ΔV CHANGING TABLE

| | POTENTIAL CONTORL REFERENCE VALUE | | | |
|---|---|---|---|---|
| NUMBER OF SUCCESSIVELY-EJECTED DROPLETS | 0.5 | 1.0 | 1.5 | 1.9 |
| 10 | 0.8 | 1.3 | 1.8 | 2.2 |
| 20 | 0.65 | 1.15 | 1.65 | 2.05 |
| 50 | 0.5 | 1.0 | 1.5 | 1.9 |
| 100 | 0.35 | 0.85 | 1.35 | 1.75 |
| 200 | 0.2 | 0.7 | 1.2 | 1.6 |
| 500 | 0.05 | 0.55 | 1.05 | 1.45 |

FIG.27

LIQUID EJECTION APPARATUS AND CONTROL METHOD

BACKGROUND

Field

The present disclosure relates to a liquid ejection apparatus including a liquid ejection head that ejects liquid such as inks.

Description of the Related Art

As an inkjet recording method, there is a method in which electrothermal conversion elements (hereinafter, also referred to as "heaters") including heating resistive elements heat an ink and generates bubbles. In a recording head using these heaters, there is a risk that an ejection speed varies from a speed intended by a designer, depending on a nozzle condition based on temperature, kogation of the ink, and the like. Accordingly, a method of correcting the ejection speed depending on the status of the recording head is required.

In order to counter the aforementioned problem, Japanese Patent Laid-Open No. 2000-246899 proposes a method in which a heating pulse applied to a heater is divided into a first drive pulse and a second drive pulse to increase an ejection speed from that in the case where a single pulse is used. In this method, an excessively-heated liquid layer is formed by using the first drive pulse and, after a sufficient thickness of the excessively-heated liquid layer is secured, rapid heating with the second drive pulse is performed. This increases bubble generation energy while securing stability of the bubble generation.

Moreover, Japanese Patent Laid-Open No. 2019-38127 discloses a technique in which, in a recording head of a recording apparatus, an upper protection layer covering a portion heated by a heater functions as one electrode and an opposing electrode connected to this one electrode through liquid is provided. This recording apparatus includes a potential control unit that forms an electric field between the upper protection layer electrode and the opposing electrode, and performs printing while setting the potential of the opposing electrode higher than that of the upper protection layer electrode in normal printing. This prevents ink color materials and resins that cause kogation and that are charged to negative potentials from being attracted to a periphery of the heater and makes kogation less likely to occur. As a result, unevenness can be suppressed.

SUMMARY

However, according to the techniques described in the aforementioned patent literatures, further improvements in image quality face a problem of an increase in control load. The reason for this is as follows: since ink droplets ejected in formation of a high-definition image are finer, the necessary number of droplets increases and the number of heat pulses for drive per unit time increases. Accordingly, in the case where multiple drive pulses are used as in Japanese Patent Laid-Open No. 2000-246899, since optimal modulation needs to be performed for each drive pulse, the control load increases.

Accordingly, in view of the aforementioned problems, an object of the present disclosure is to provide a technique of suppressing unevenness with lower control load than that in a conventional technique.

An aspect of the present disclosure is a liquid ejection apparatus including: a liquid ejection head including a conversion element that generates energy required to eject liquid, a first protection layer that blocks contact between the conversion element and the liquid, a second protection layer that partially covers the first protection layer and functions as a first electrode, a second electrode that is electrically connected to the first electrode through the liquid, and an ejection port that ejects the liquid, and a control unit configured to control a potential difference between the first electrode and the second electrode in printing to a predetermined value by changing at least one of potentials of the first electrode and the second electrode, in which the control unit sets the potential difference based on at least one of a condition and a configuration of the liquid ejection head.

Further features of the present disclosure will become apparent from the following description of exemplary embodiments with reference to the attached drawings.

BRIEF DESCRIPTION OF THE DRAWINGS

FIG. 22 is a diagram illustrating a ΔV changing table;

FIG. 24 is a diagram illustrating a ΔV changing table;

FIG. 27 is a diagram illustrating a ΔV changing table; and

DESCRIPTION OF THE EMBODIMENTS

Figure 1:
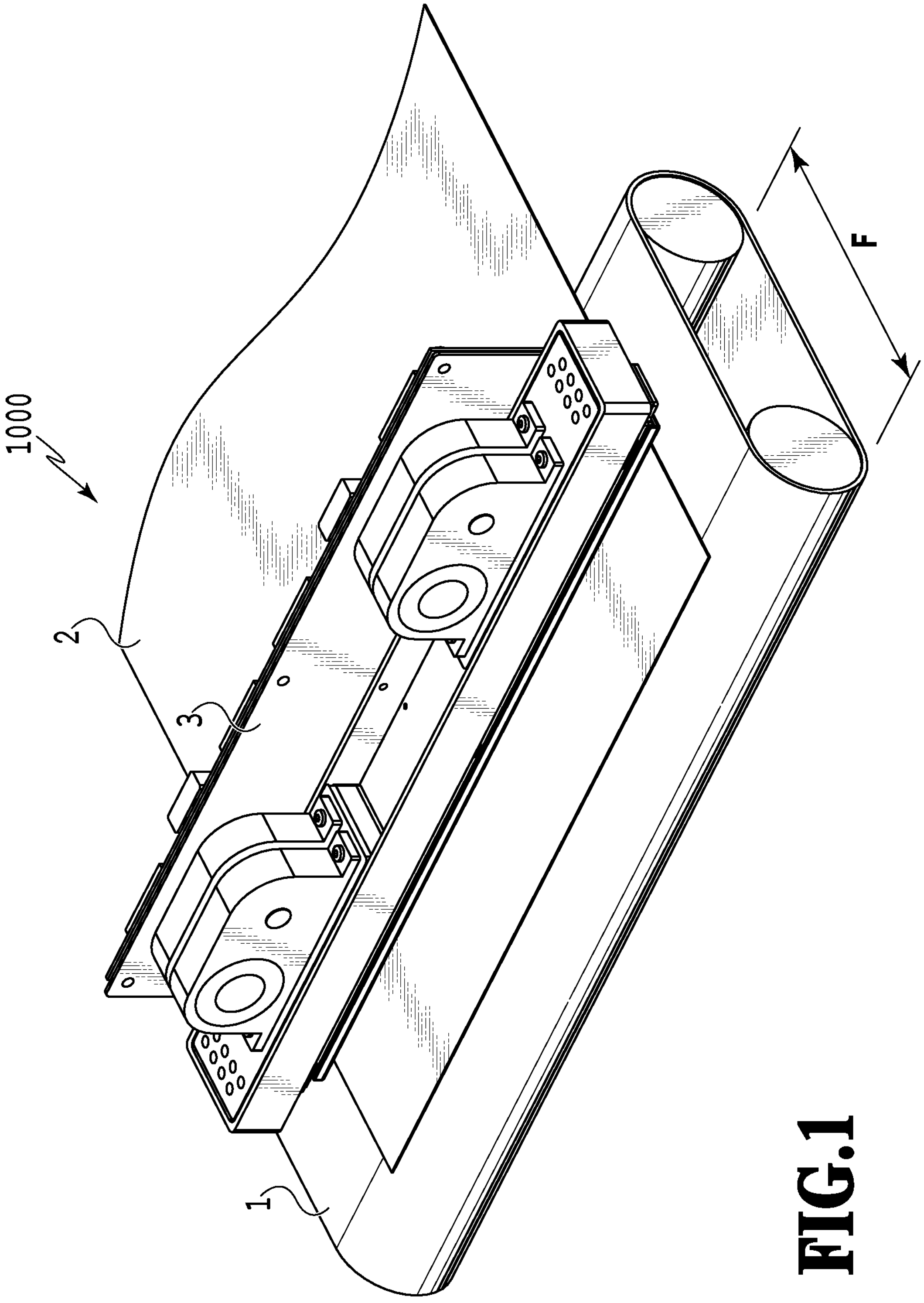
FIG. 1 is a view illustrating a schematic configuration of a recording apparatus.

A recording apparatus employing an inkjet recording method is described below as an example of the present disclosure. The recording apparatus may be, for example, a single function printer having only a recording function or a multi-function printer having multiple functions such as the recording function, a facsimile function, and a scanner function. Moreover, the present disclosure may be applied to a manufacturing apparatus for manufacturing a color filter, an electronic device, an optical device, a fine structure, or the like by using a predetermined recording method.

Note that, in the following description, "record" does not refer only to the case of forming meaningful information such as letters and figures and products to be recorded may be meaningful or meaningless. Moreover, "record" widely refers to the case of forming images, designs, patterns, structures, and the like on a record medium or the case of processing the media, regardless of whether or not the recorded product is apparent to be visually noticeable by human.

Moreover, the "record medium" refers not only to general paper used in a recording apparatus but also to media that can receive ink such as cloth, a plastic film, a metal plate, glass, ceramic, resin, wood, and leather.

Furthermore, the "ink" should be widely interpreted like the aforementioned definition of "record". Accordingly, the "ink" refers to a liquid that can be used to form images, designs, patterns, and the like, process the record medium, or treat an ink (for example, solidify or insolubilize a colorant in the ink applied to the record medium) by being applied onto the record medium.

Moreover, the "recording element" (also referred to as "nozzle" in some cases) refers to an ink ejection port, a liquid passage communicating therewith, and an element that generates energy used for ink ejection as whole unless otherwise noted.

First Embodiment

Although the present embodiment relates to an inkjet recording apparatus of a mode in which liquid such as an ink is circulated between a tank and a liquid ejection head, the mode of the inkjet recording apparatus may be different. For example, the mode may be such that, instead of circulating the ink, two tanks are provided upstream and downstream of the liquid ejection head and the ink is made to flow from one tank to the other tank to cause the ink in a pressure chamber to flow.

Moreover, although the liquid ejection head according to the present embodiment is a so-called line-type head having a length corresponding to the width of a recording medium, the present embodiment can be also applied to a so-called serial-type liquid ejection head that performs recording while scanning the recording medium. Although a configuration in which one recording element board for a black ink and one recording element board for color inks are mounted can be given as an example of the configuration of the serial liquid ejection head, the configuration is not limited this. Specifically, the mode may be as follows: a short line head that has a smaller width than the recording medium and in which multiple recording element boards are arranged such that ejection port nozzle rows overlap one another in an ejection port nozzle row direction is fabricated and made to scan the recording medium.

<Inkjet Recording Apparatus>

FIG. 1 illustrates a schematic configuration of a liquid ejection apparatus according to the present embodiment, specifically an inkjet recording apparatus 1000 (hereinafter, also referred to as recording apparatus) that performs recording by ejecting inks. The recording apparatus 1000 includes a conveyance unit 1 that conveys recording media 2 and a line-type liquid ejection head 3 that is arranged to be substantially orthogonal to a conveyance direction of the recording medium, and is a line-type recording apparatus that performs continuous recording in one pass while continuously or intermittently conveying multiple recording media 2. The recording media 2 are not limited to cut paper and may be continuous roll paper. The liquid ejection head 3 is capable of performing full color printing by using cyan, magenta, yellow, and black (CMYK) inks. In the liquid ejection head 3, a main tank, a buffer tank, and a liquid supplying unit that forms a supply passage for supplying the inks to the liquid ejection head as described later are fluidly connected to one another (see FIG. 2). Moreover, an electric control unit that sends electric power and ejection control signals to the liquid ejection head 3 is electrically connected to the liquid ejection head 3. Liquid paths and electrical signal paths in the liquid ejection head 3 are described later.

<First Circulation Path>

Figure 2:
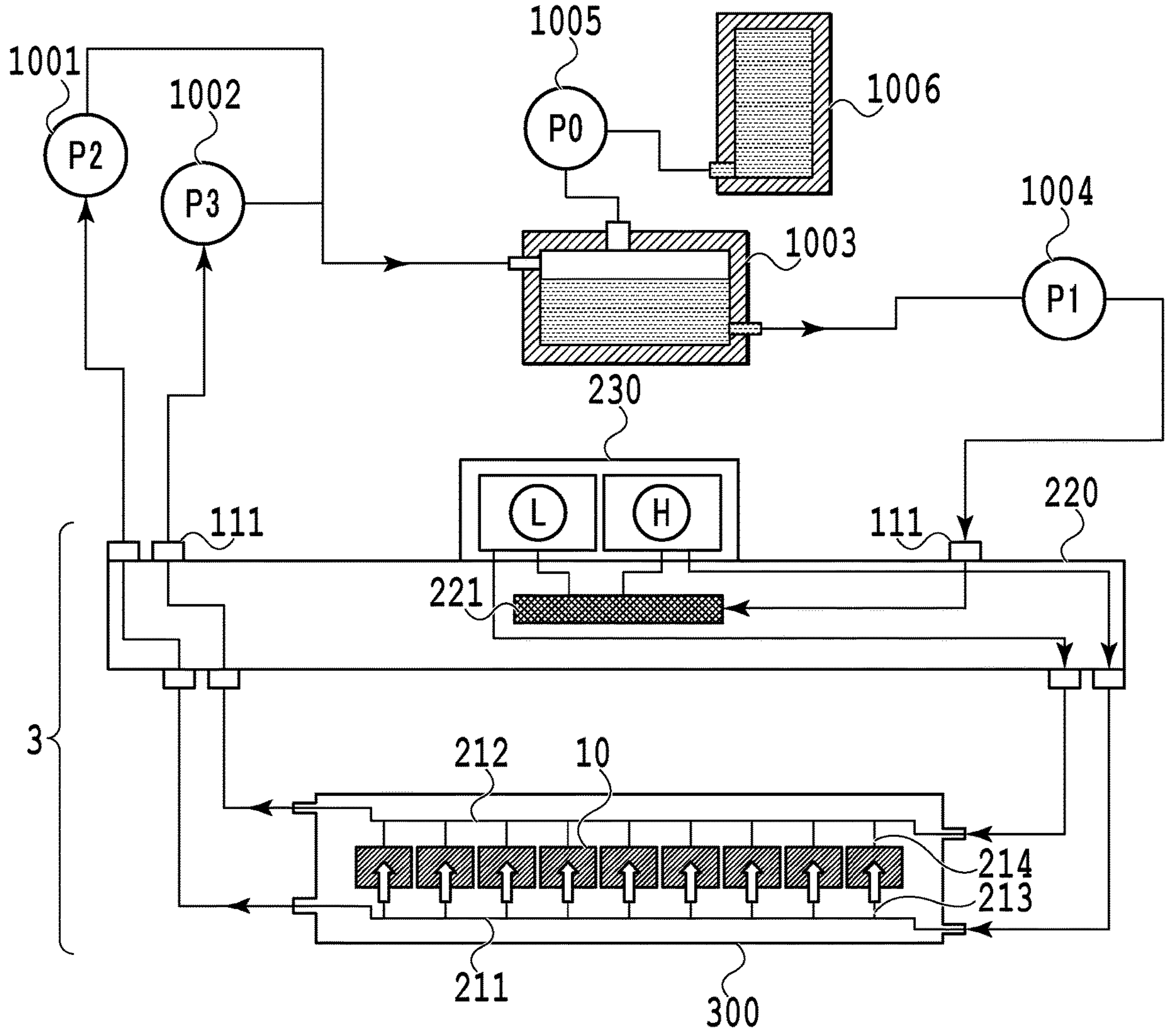
FIG. 2 is a schematic view illustrating a first circulation path.

FIG. 2 is a schematic view illustrating a first circulation path as one mode of a circulation path applied to the recording apparatus according to the present embodiment. As illustrated in FIG. 2, the liquid ejection head 3 is fluidly connected to a first circulation pump (high pressure side) 1001, a first circulation pump (low pressure side) 1002, a buffer tank 1003, and the like. Although a path in which only one of the CMYK inks flows is illustrated in FIG. 2 to simplify the explanation, circulation paths for the four colors are actually provided in the liquid ejection head 3 and a recording apparatus main body.

The buffer tank 1003 that is connected to a main tank 1006 and that serves as a sub tank has an atmosphere communication port (not illustrated) that allows the inside and the outside of the tank to communicate with each other, and air bubbles in the ink can be discharged to the outside. The buffer tank 1003 is also connected to a replenishing pump 1005. In the case where the ink is consumed in the liquid ejection head 3, the replenishing pump 1005 transfers the ink equivalent to a consumed amount from the main tank 1006 to the buffer tank 1003. The ink is consumed in the liquid ejection head 3, for example, in the case where the ink is ejected (discharged) from the ejection port of the liquid ejection head in operations such as recording and suction recovery performed by ejecting the ink.

The two first circulation pumps 1001 and 1002 have a role of pumping out the ink from liquid connecting portions 111 of the liquid ejection head 3 and causing the ink to flow to the buffer tank 1003. The first circulation pumps are each preferably a displacement pump that has a quantitative liquid sending capability. Specifically, a tube pump, a gear pump, a diaphragm pump, a syringe pump, and the like can be given as examples. For example, a mode of securing a constant flow rate by arranging a general constant flow rate valve or a relief valve at a pump outlet may also be used. In driving of the liquid ejection head 3, the first circulation pump (high pressure side) 1001 and the first circulation pump (low pressure side) 1002 cause the ink to flow at a constant rate in each of a common supply flow passage 211 and a common collection flow passage 212. The flow rate is preferably set equal to or higher than such a flow rate that temperature differences among recording element boards 10 in the liquid ejection head 3 is at a level at which recorded image quality is not affected. However, in the case where an excessively high flow rate is set, negative pressure differences among the recording element boards 10 become too large due to an effect of pressure droplet in flow passages in a liquid ejection unit 300, and image density unevenness occurs. Accordingly, it is preferable to set the flow rate while taking the temperature differences and the negative pressure differences among the recording element boards 10 into consideration.

A negative pressure control unit 230 is provided in the middle of a path connecting a second circulation pump 1004 and the liquid ejection unit 300. Accordingly, the negative pressure control unit 230 has a function of operating such that pressure downstream (that is, on the liquid ejection unit 300 side) of the negative pressure control unit 230 is maintained at a preset constant pressure even in the case where the flow rate in a circulation system fluctuates due to a difference in duty of recording. Any mechanisms can be used as two pressure adjustment mechanisms that form the negative pressure control unit 230 as long as they can control the pressure downstream of the negative pressure control unit 230 such that the pressure fluctuates within a certain range centered at a desired set pressure. For example, a mechanism similar to a so-called "depressurization regulator" can be used. In the case where the depressurization regulator is used, as illustrated in FIG. 2, the second circulation pump 1004 preferably applies pressure on the upstream side of the negative pressure control unit 230 via a liquid supply unit 220. Since this configuration can suppress an effect of a hydraulic head pressure of the buffer tank 1003 on the liquid ejection head 3, a degree of freedom in layout of the buffer tank 1003 in the recording apparatus 1000 can be improved. The second circulation pump 1004 only needs to be a pump that has a lifting range pressure of a certain pressure or higher in a range of an ink circulation flow rate used in the drive of the liquid ejection head 3, and a turbo pump, a displacement pump, or the like can be used. Specifically, a diaphragm pump or the like can be applied. Moreover, for example, a hydraulic head tank arranged to have a certain hydraulic head difference with respect to the negative pressure control unit 230 can be applied instead of the second circulation pump 1004.

As illustrated in FIG. 2, the negative pressure control unit 230 includes the two pressure adjustment mechanisms for which different control pressures are set, respectively. A pressure adjustment mechanism on the higher pressure setting side (denoted by H in FIG. 2) out of the two negative pressure adjustment mechanisms is connected to the common supply flow passage 211 in the liquid ejection unit 300 via an interior of the liquid supply unit 220. Meanwhile, a pressure adjustment mechanism on the lower pressure setting side (denoted by L in FIG. 2) is connected to the common collection flow passage 212 via the interior of the liquid supply unit 220.

The liquid ejection unit 300 is provided with the common supply flow passage 211, the common collection flow passage 212, and individual supply flow passages 213 and individual collection flow passages 214 that communicate with the recording element boards 10. Since the individual supply flow passages 213 and the individual collection flow passages 214 communicate with the common supply flow passage 211 and the common collection flow passage 212, there is generated a flow (arrows in FIG. 2) in which part of the ink flows from the common supply flow passage 211 to the common collection flow passage 212 while passing through internal flow passages of the recording element board 10. The reason for this is that, since the pressure adjustment mechanism H is connected to the common supply flow passage 211 and the pressure adjustment mechanism L is connected to the common collection flow passage 212, a differential pressure is generated between the two common flow passages.

As described above, in the liquid ejection unit 300, the flow in which part of the ink passes through interiors of the recording element boards 10 is generated while the ink flows to pass through interiors of the common supply flow passage 211 and the common collection flow passage 212. Accordingly, the flow through the common supply flow passage 211 and the common collection flow passage 212 allows heat generated in the recording element boards 10 to be discharged to the outside of the recording element boards 10. Moreover, since such a configuration can generate a flow of ink also in ejection ports and pressure chambers not performing recording while the liquid ejection head 3 performs the recording, an increase in the viscosity of the ink in such portions can be suppressed. Furthermore, the ink with increased viscosity and foreign objects in the ink can be discharged to the common collection flow passage 212. Accordingly, the liquid ejection head 3 of the present embodiment can perform high-quality recording at high speed.

<Second Circulation Path>

Figure 3:
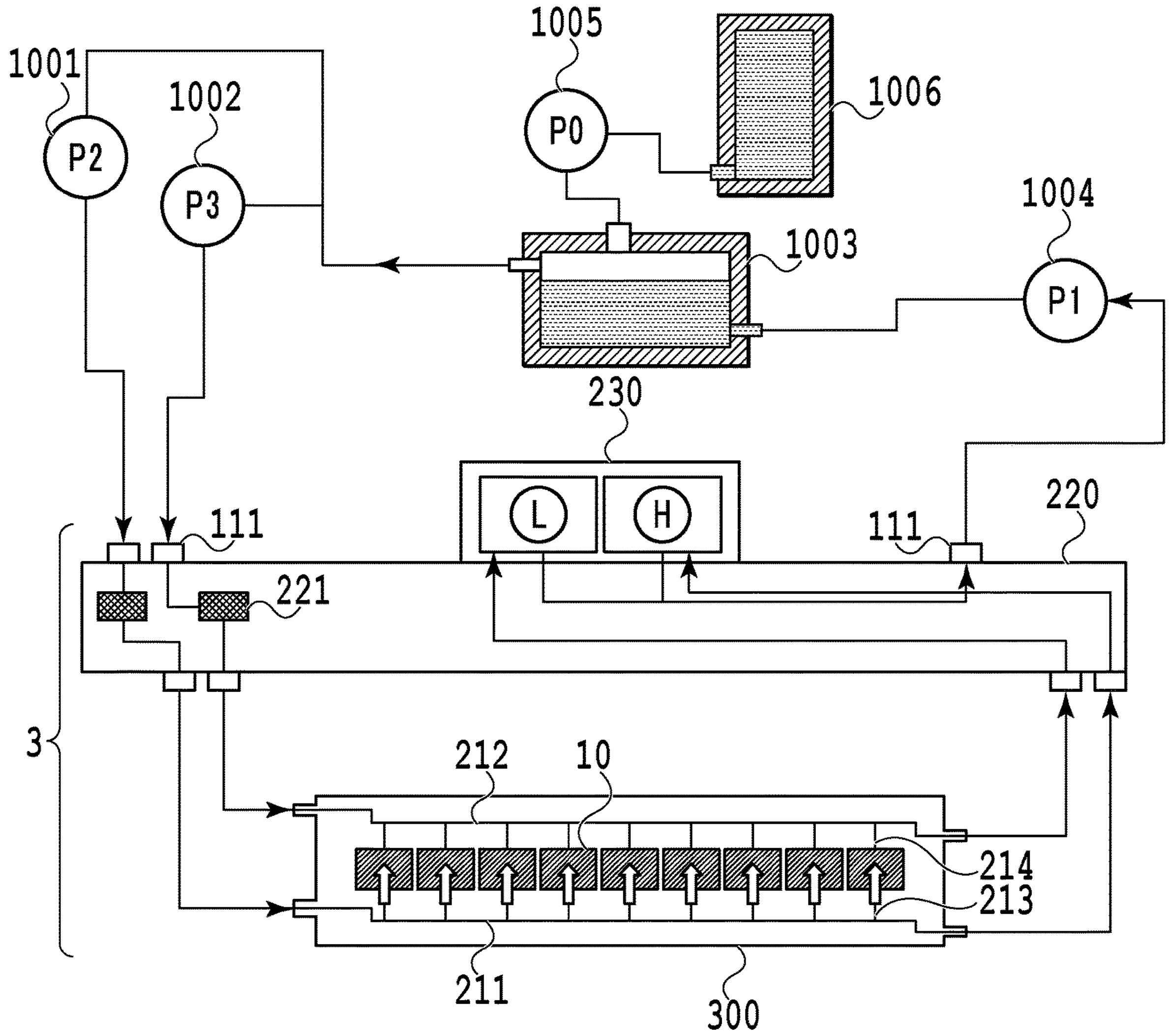
FIG. 3 is a schematic view illustrating a second circulation path.

FIG. 3 is a schematic view illustrating a second circulation path different from the aforementioned first circulation path among circulation paths applied to the recording apparatus according to the present embodiment. Main differences from the first circulation path are as follows.

First, the two pressure adjustment mechanisms forming the negative pressure control unit 230 both have mechanisms (mechanism parts having the same functions as so-called "backpressure regulator") that control a pressure upstream of the negative pressure control unit 230 such that the pressure fluctuates within a certain range centered at a desired set pressure. Moreover, the second circulation pump 1004 functions as a negative pressure source that reduces pressure on the downstream side of the negative pressure control unit 230. Furthermore, the first circulation pump (high pressure side) 1001 and the first circulation pump (low pressure side) 1002 are arranged upstream of the liquid ejection head and the negative pressure control unit 230 is arranged downstream of the liquid ejection head.

The negative pressure control unit 230 in the second circulation path operates such that pressure upstream (that is, on the liquid ejection unit 300) of the negative pressure control unit 230 fluctuates within the certain range even in the case where a flow rate fluctuates due to changes in recording duty in the case where the liquid ejection head 3 performs the recording. The pressure fluctuates within, for example, a certain range centered at a preset pressure. As illustrated in FIG. 3, the second circulation pump 1004 preferably applies pressure on the downstream side of the negative pressure control unit 230 via the liquid supply unit 220. Since this configuration can suppress an effect of a hydraulic head pressure of the buffer tank 1003 on the liquid ejection head 3, a degree of freedom in layout of the buffer tank 1003 in the recording apparatus 1000 can be improved. For example, a hydraulic head tank arranged to have a certain hydraulic head difference with respect to the negative pressure control unit 230 can be applied instead of the second circulation pump 1004.

As in the first circulation path, the negative pressure control unit 230 illustrated in FIG. 3 includes two pressure adjustment mechanisms for which different control pressures are set, respectively. A pressure adjustment mechanism on the higher pressure setting side (denoted by H in FIG. 3) out of the two pressure adjustment mechanisms is connected to the common supply flow passage 211 in the liquid ejection unit 300 via the interior of the liquid supply unit 220. Meanwhile, a pressure adjustment mechanism on the lower pressure setting side (denoted by L in FIG. 3) is connected to the common collection flow passage 212 via the interior of the liquid supply unit 220.

The two pressure adjustment mechanisms make the pressure in the common supply flow passage 211 higher than the pressure in the common collection flow passage 212. This configuration generates an ink flow in which the ink flows from the common supply flow passage 211 to the common collection flow passage 212 via the individual flow passages 213 and the internal flow passages of the recording element boards 10 (arrows in FIG. 3). As described above, in the second circulation path, an ink flow state similar to that in the first circulation path is obtained in the liquid ejection unit 300. Meanwhile, the second circulation path has two advantages different from those of the first circulation path.

The first advantage is as follows: in the second circulation path, since the negative pressure control unit 230 is arranged downstream of the liquid ejection head 3, a risk that dusts and foreign objects generated in the negative pressure control unit 230 flow into the head is low. The second advantage is as follows: the maximum value of the flow rate necessary for supplying from the buffer tank 1003 to the liquid ejection head 3 in the second circulation path is smaller than that in the first circulation path. The reason for this is as follows. A total of the flow rates in the common supply flow passage 211 and the common collection flow passage 212 in the case where the ink is circulated in a recording standby period is referred to as A. The value of A is defined as the minimum flow rate necessary to cause the temperature difference in the liquid ejection unit 300 to fall within the desired range in the case where the temperature of the liquid ejection head 3 is adjusted during the recording standby period. Moreover, an ejection flow rate in the case where the ink is ejected from all ejection ports in the liquid ejection unit 300 (all ejection) is defined as F. Then, in the case of the first circulation path (FIG. 2), a set flow rate of the first circulation pump (high pressure side) 1001 and the first circulation pump (low pressure side) 1002 is A. Accordingly, the maximum value of the liquid supply rate to the liquid ejection head 3 necessary in the all ejection is A+F.

Meanwhile, in the case of the second circulation path (FIG. 3), the liquid supply rate to the liquid ejection head 3 necessary in the recording standby period is the flow rate A. The supply rate to the liquid ejection head 3 necessary in the all ejection is the flow rate F. Then, in the case of the second circulation path, the total value of the set flow rates of the first circulation pump (high pressure side) 1001 and the first circulation pump (low pressure side) 1002, that is the maximum value of the necessary supply flow rate is a value of the larger one of A and F. Accordingly, the maximum value (A or F) of the necessary supply rate in the second circulation path is inevitably smaller than the maximum value (A+F) of the necessary supply flow rate in the first circulation path, provided that the liquid ejection unit 300 with the same configuration is used. In the case of the second circulation path, the degree of freedom in applicable circulation pumps is thus improved. Accordingly, for example, it is possible to use low-cost circulation pumps with simple configurations or reduce load of a cooler (not illustrated) installed in a path on the main body side and the second circulation path has an advantage of enabling cost reduction of the recording apparatus main body. This advantage is greater in line heads in which the value of A or F is relatively large, and, among the line heads, a line head with a large length in the longitudinal direction benefits more.

However, the first circulation path also has advantages over the second circulation path. Specifically, in the second circulation path, since the flow rate of the ink flowing in the liquid ejection unit 300 is maximum in the recording standby period, the lower the recording duty is, the higher the negative pressure applied to each nozzle is. Accordingly, particularly in the case where the flow passage widths (lengths in the direction orthogonal to the flow direction of the ink) of the common supply flow passage 211 and the common collection flow passage 212 are reduced to reduce a head width (length of the liquid ejection head in the direction of the shorter side), a high negative pressure is applied to the nozzle in a low duty image in which unevenness tends to be noticeable. Such application of a high negative pressure may increase effects of satellite droplets. Meanwhile, in the first circulation path, since the timing at which a high negative pressure is applied to the nozzle is in formation of a high duty image, there is such an advantage that, even in the case where satellite droplets are generated, the satellite droplets are less noticeable and effects thereof on the recorded image are small. A preferable one of the two circulation paths can be selected and employed depending on the specifications (ejection flow rate F, minimum circulation flow rate A, and in-head flow passage resistance) of the liquid ejection head and the recording apparatus main body.

<Configuration of Liquid Ejection Head>

Figure 4A:
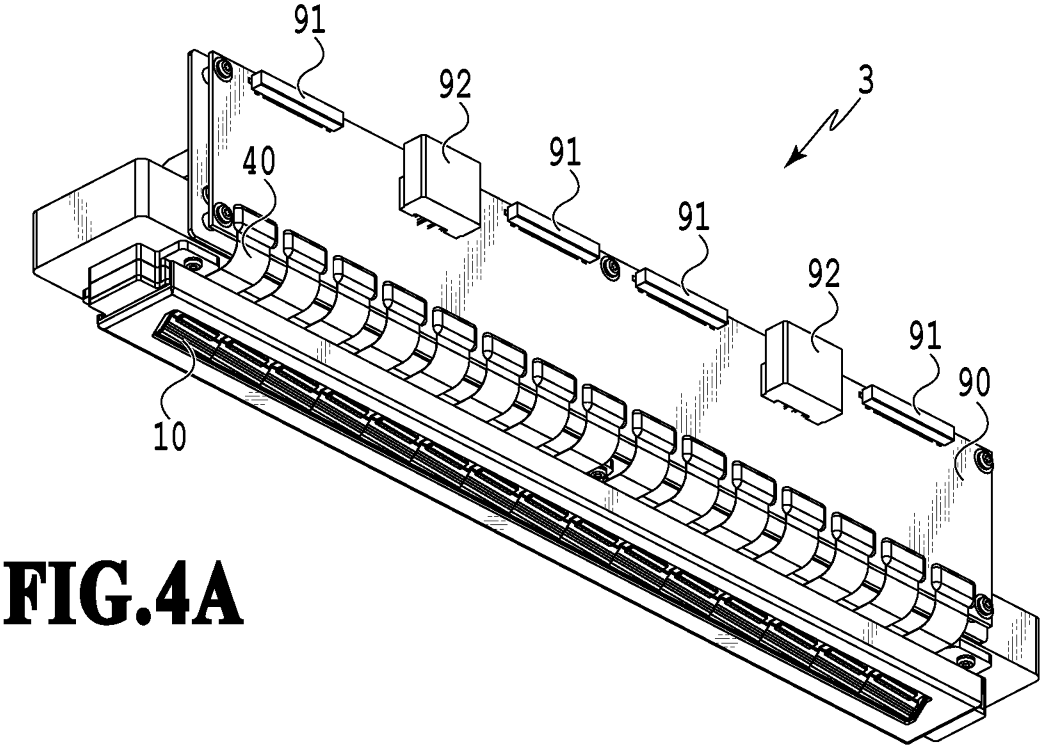
FIGS. 4A and 4B are perspective views of a liquid ejection head.
Figure 4B:
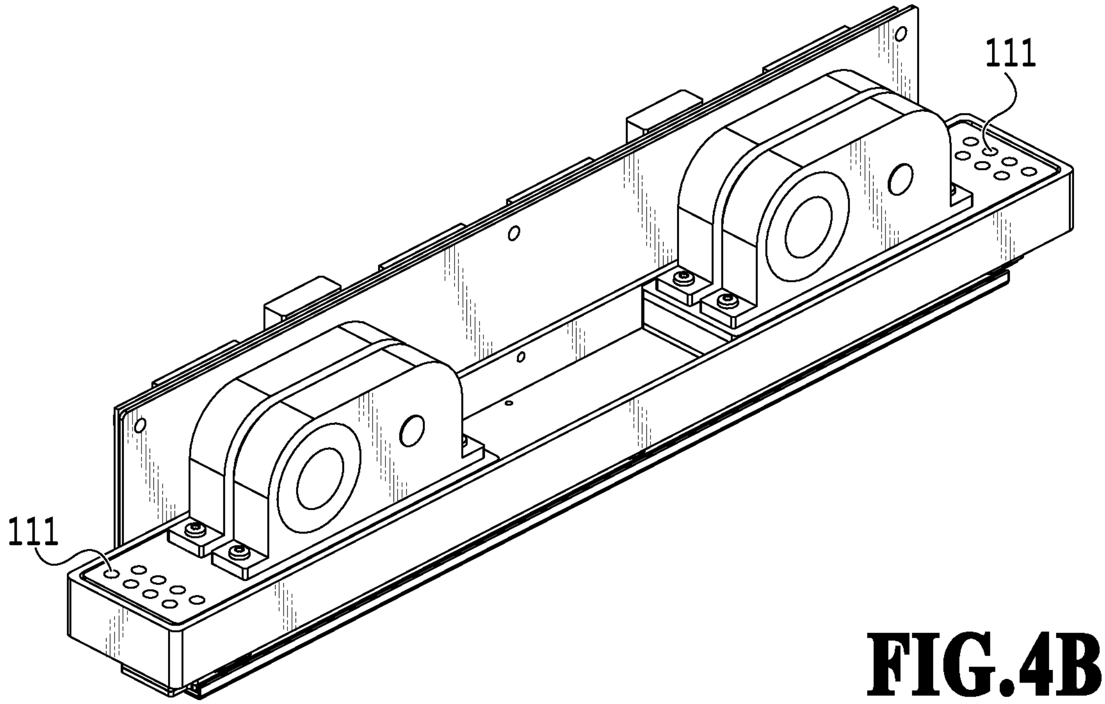

A configuration of the liquid ejection head 3 according to the first embodiment is described. FIGS. 4A and 4B are perspective views of the liquid ejection head 3 according to the present embodiment. The liquid ejection head 3 is a line type liquid ejection head in which 15 recording element boards 10 each capable of ejecting the inks of four colors of C, M, Y, and K are aligned in a straight line (arranged in line). As illustrated in FIG. 4A, the liquid ejection head 3 includes signal input terminals 91 and electric power supply terminals 92 electrically connected to the recording element boards 10 via flexible wiring boards 40 and an electric wiring board 90. The signal input terminals 91 and the electric power supply terminals 92 are electrically connected to a control unit of the recording apparatus 1000, ejection drive signals are supplied to the recording element boards 10 via the signal input terminals 91, and electric power necessary for the ejection is supplied to the recording element boards 10 via the electric power supply terminals 92.

Gathering wires in one place by using an electric circuit in the electric wiring board 90 can make the number of the signal input terminals 91 and the electric power supply terminals 92 smaller than the number of recording element boards 10. The number of electric connecting portions that need to be attached in attachment of the liquid ejection head 3 to the recording apparatus 1000 or removed in replacement of the liquid ejection head can be thereby reduced. As illustrated in FIG. 4B, the liquid connecting portions 111 provided in both end portions of the liquid ejection head 3 are connected to a liquid supply system of the recording apparatus 1000. The inks of four colors of CMYK are thereby supplied from the supply system of the recording apparatus 1000 to the liquid ejection head 3 and the inks having passed an interior of the liquid ejection head 3 are collected into the supply system of the recording apparatus 1000. The inks of the respective colors can be thus circulated via the paths of the recording apparatus 1000 and the paths of the liquid ejection head 3.

Figure 5:
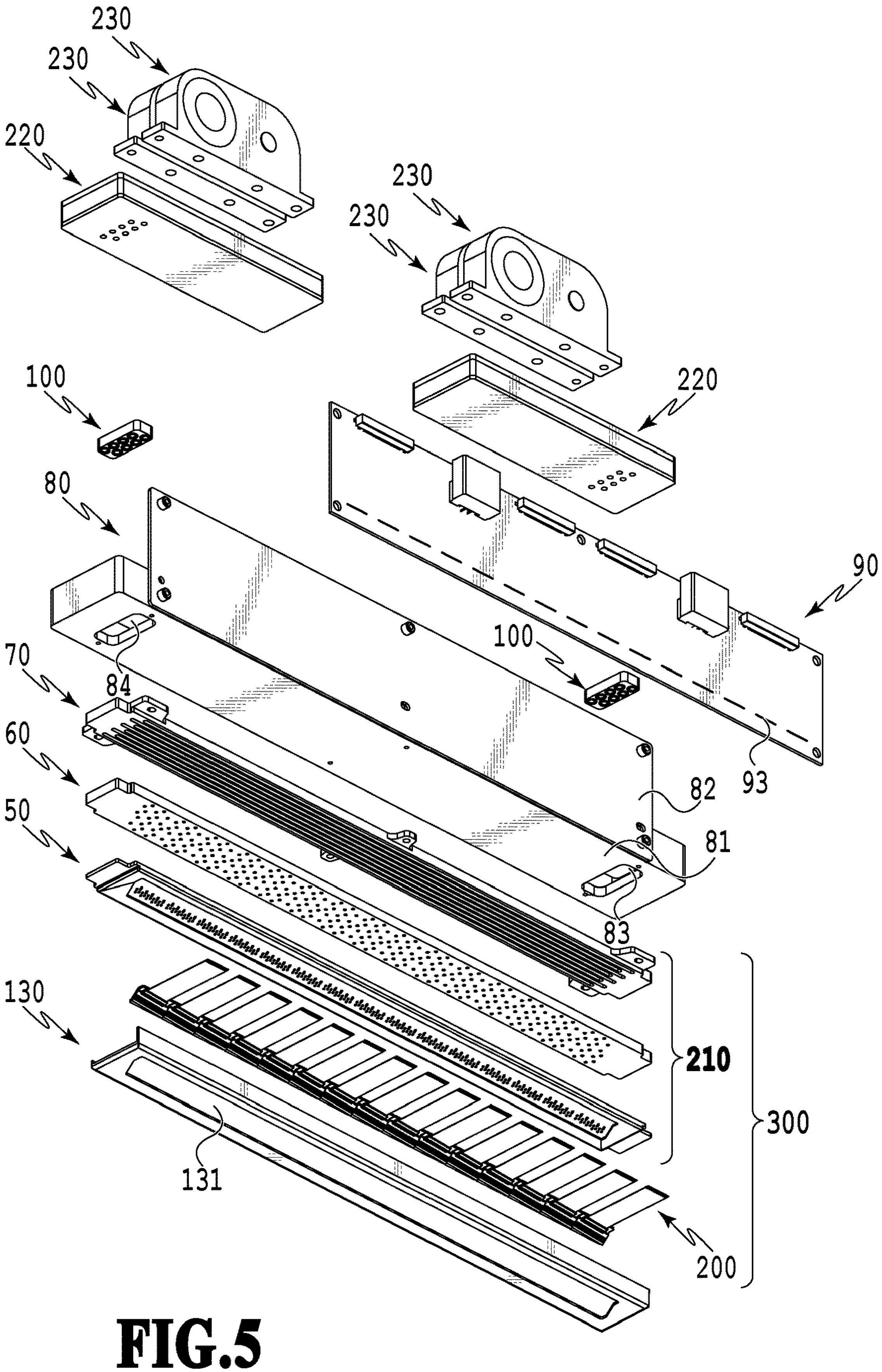
FIG. 5 is an exploded perspective view of the liquid ejection head.

FIG. 5 illustrates an exploded perspective view of parts or units forming the liquid ejection head 3. The liquid ejection unit 300, the liquid supply units 220, and the electric wiring board 90 are attached to a case 80. The liquid supply units 220 are provided with the liquid connecting portions 111 (FIGS. 2 and 3) and filters 221 (FIGS. 2 and 3) for the respective colors that communicate with openings of the liquid connecting portions 111 are provided in the liquid supply units 220 to remove foreign objects in the supplied inks. The two liquid supply units 220 are each provided with the filters 221 respectively for two colors. The inks having passed the filters 221 are supplied to the negative pressure control units 230 corresponding to the respective colors and arranged on the liquid supply units 220.

The negative pressure control units 230 are units including pressure adjustment valves for the respective colors. Each of the negative pressure control units 230 greatly attenuates a pressure droplet change in the supply system (supply system upstream of the liquid ejection head 3) of the recording apparatus 1000 that occurs with fluctuation in the ink flow rate, by means of actions of valves, spring members, and the like provided in the negative pressure control unit 230. Accordingly, the negative pressure control units 230 can stabilize the negative pressure change downstream (on the liquid ejection unit 300 side) of the negative pressure control unit within a certain range. Two pressure adjustment valves for each color are incorporated in the negative pressure control unit 230 of each color as illustrated in FIG. 2. Different control pressures are set for the respective pressure adjustment valves and the valve on the high pressure side and the valve on the low pressure side communicate with the common supply flow passage 211 and the common collection flow passage 212, respectively, in the liquid ejection unit 300 via the liquid supply unit 220.

The case 80 is formed of a liquid ejection unit supporting portion 81 and an electric wiring board supporting portion 82, supports the liquid ejection unit 300 and the electric wiring board 90, and secures the stiffness of the liquid ejection head 3. The electric wiring board supporting portion 82 is a portion for supporting the electric wiring board 90 and is fixed to the liquid ejection unit supporting portion 81 with screws. The liquid ejection unit supporting portion 81 has a role of correcting warping and deforming of the liquid ejection unit 300 and securing positional accuracy of the multiple recording element boards 10 relative to one another, and thereby suppresses stripes and unevenness in a recorded product. Accordingly, the liquid ejection unit supporting portion 81 preferably has sufficient stiffness and the material thereof is preferably a metal material such as SUS or aluminum or a ceramic such as alumina. Openings 83 and 84 in which joint rubbers 100 are inserted are provided in the liquid ejection unit supporting portion 81. The inks supplied from the liquid supply units 220 are guided to a third flow passage member 70 forming the liquid ejection unit 300 via the joint rubbers.

The liquid ejection unit 300 includes multiple ejection modules 200 and a flow passage member 210, and a cover member 130 is attached to a surface of the liquid ejection unit 300 on the recording medium side. In this example, as illustrated in FIG. 5, the cover member 130 is a member having a frame shaped surface provided with a long opening 131, and the recording element boards 10 and sealing members 110 (FIG. 9A) included in the ejection modules 200 are exposed through the opening 131. A frame portion in a periphery of the opening 131 has a function of a contact surface with a cap member that caps the liquid ejection head 3 in the recording standby period. Accordingly, it is preferable to apply adhesive, a sealing material, a filler, or the like along the periphery of the opening 131 and fill unevenness and gaps on an ejection port surface of the liquid ejection unit 300 to form a closed space in a capped state.

Next, a configuration of the flow passage member 210 included in the liquid ejection unit 300 is described. As illustrated in FIG. 5, the flow passage member 210 is a member in which a first flow passage member 50, a second flow passage member 60, and the third flow passage member 70 are stacked one on top of another. The flow passage member 210 distributes the inks supplied from the liquid supply units 220 to the ejection modules 200 and returns the ink flowing back from the ejection modules 200 to the liquid supply units 220. The flow passage member 210 is fixed to the liquid ejection unit supporting portion 81 with screws and this suppresses warping and deforming of the flow passage member 210.

Figure 6:
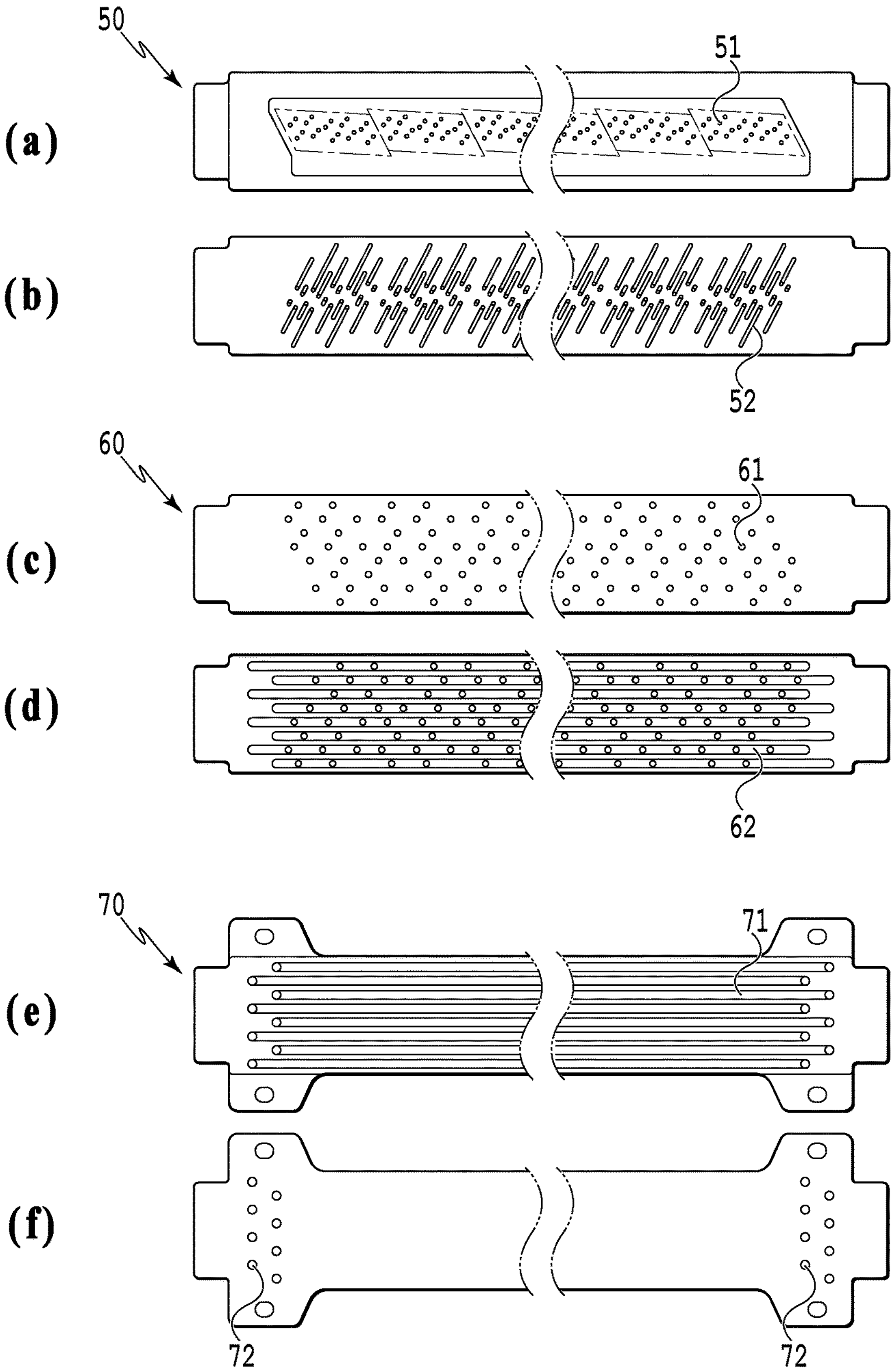
FIG. 6 is a view illustrating flow passage members.
Figure 7:
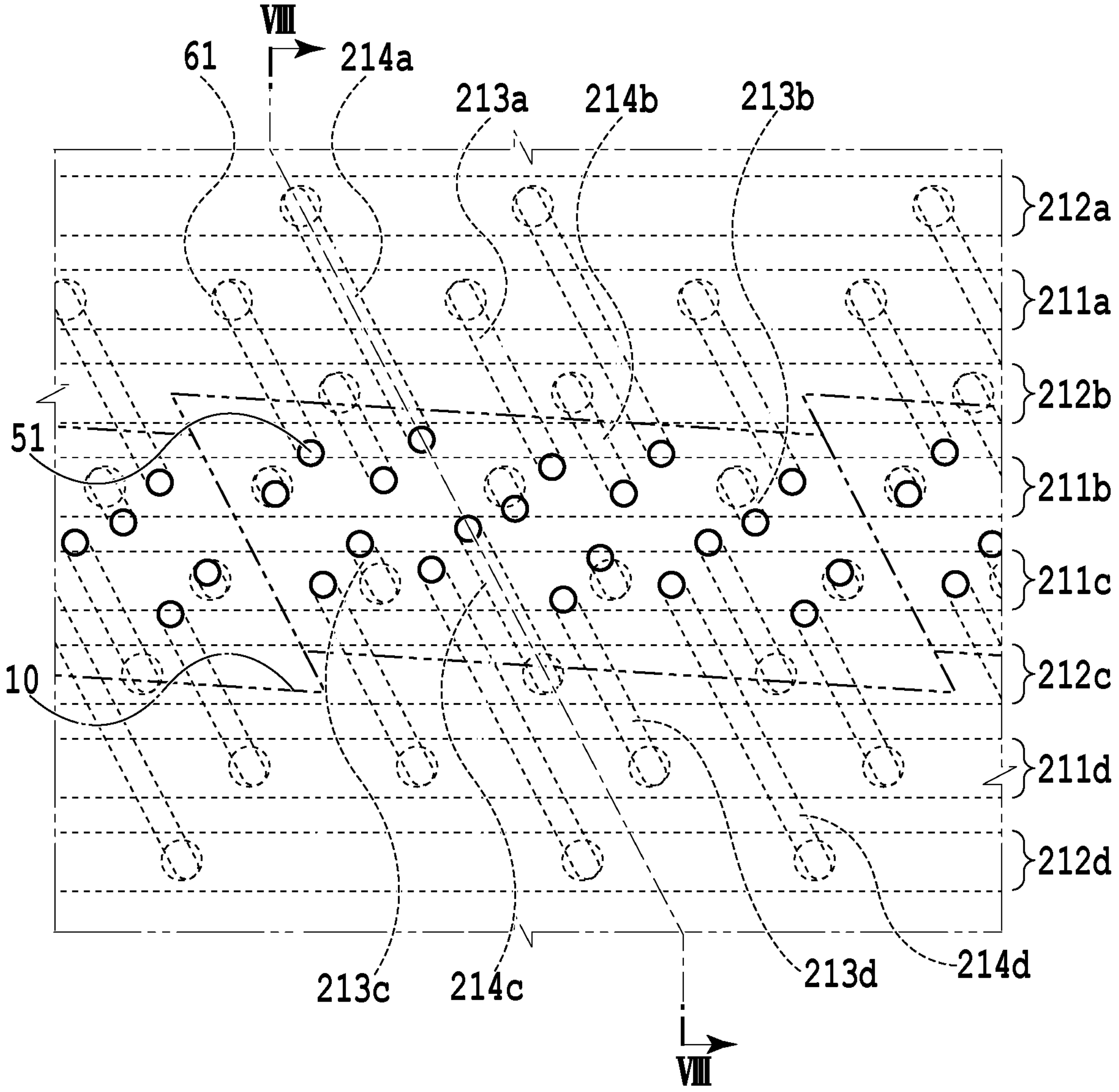
FIG. 7 is a view illustrating connection relationships of flow passages in the flow passage members.

FIG. 6 is a view illustrating front faces and back faces of the first to third flow passage members. Reference sign (a) in FIG. 6 denotes a face of the first flow passage member 50 on the side where the ejection modules 200 are mounted and Reference sign (f) denotes a face of the third flow passage member 70 on the side in contact with the liquid ejection unit supporting portion 81. The first flow passage member 50 and the second flow passage member 60 are joined to each other such that the face denoted reference sign (b) in FIG. 6 and the face denoted by reference sign (c) which are contact surfaces of the respective flow passage members face each other. The second flow passage member and the third flow passage member are joined to each other such that the face denoted reference sign (d) in FIG. 6 and the face denoted reference sign (e) which are contact surfaces of the respective flow passage members face each other. Joining the second flow passage member 60 and the third flow passage member 70 causes a group of common flow passage grooves 62 and a group of common flow passage grooves 71 formed in the respective flow passage members to form eight common flow passages extending in the longitudinal direction of the flow passage members. As illustrated in FIG. 7, a set of the common supply flow passage 211 and the common collection flow passage 212 are formed for each color in the flow passage member 210. Communication ports 72 of the third flow passage member 70 communicate with the respective holes of the joint rubbers 100 and fluidly communicate with the liquid supply units 220. Multiple communication ports 61 are formed on bottom surfaces of the common flow passage grooves 62 of the second flow passage member 60 and communicate with one end portions of individual flow passage grooves 52 of the first flow passage member 50. Communication ports 51 are formed in the other end portions of the individual flow passage grooves 52 of the first flow passage member 50 and the individual flow passage grooves 52 fluidly communicate with the multiple ejection modules 200 via the communication ports 51. The individual flow passage grooves 52 allow the flow passages to be gathered on the center side of the flow passage member.

The first to third flow passage members are preferably made of a material that is corrosion resistant to liquid and that has a low coefficient of linear thermal expansion. For example, a composite material (resin material) that uses alumina, liquid crystal polymer (LCP), polyphenylenesulfide (PPS), or polysulfone (PSF) as a base material and to which an inorganic filler such as silica fine particles and fibers are added can be preferably used as the material. As a method of forming the flow passage member 210, the three flow passage members may be stacked and bonded to one another. Moreover, in the case where a composite resin material is selected as the material, a bonding method by welding may be employed.

Next, connection relationships of the flow passages in the flow passage member 210 are described by using FIG. 7. FIG. 7 is a transparent view in which the flow passages in the flow passage member 210 formed by joining the first to third flow passage members are partially viewed in an enlarged manner from the side of the face of the first flow passage member 50 on which the ejection modules 200 are mounted. The flow passage member 210 is provided with the common supply flow passages 211 (211*a*, 211*b*, 211*c*, and 211*d*) for the respective colors and the common collection flow passages 212 (212*a*, 212*b*, 212*c*, and 212*d*) for the respective colors that extend in the longitudinal direction of the liquid ejection head 3. Multiple individual supply flow passages (213*a*, 213*b*, 213*c*, or 213*d*) formed by the individual flow passage grooves 52 are connected to the common supply flow passage 211 for each color via the communication ports 61. Multiple individual collection flow passages (214*a*, 214*b*, 214*c*, or 214*d*) formed by the individual flow passage grooves 52 are connected to the common collection flow passage 212 for each color via the communication ports 61. Such a flow passage configuration allows the inks to be gathered from the common supply flow passages 211 to the recording element boards 10 located in a center portion of the flow passage members via the individual supply flow passages 213. Moreover, the ink can be collected from the recording element boards 10 into the common collection flow passages 212 via the individual collection flow passages 214.

Figure 8:
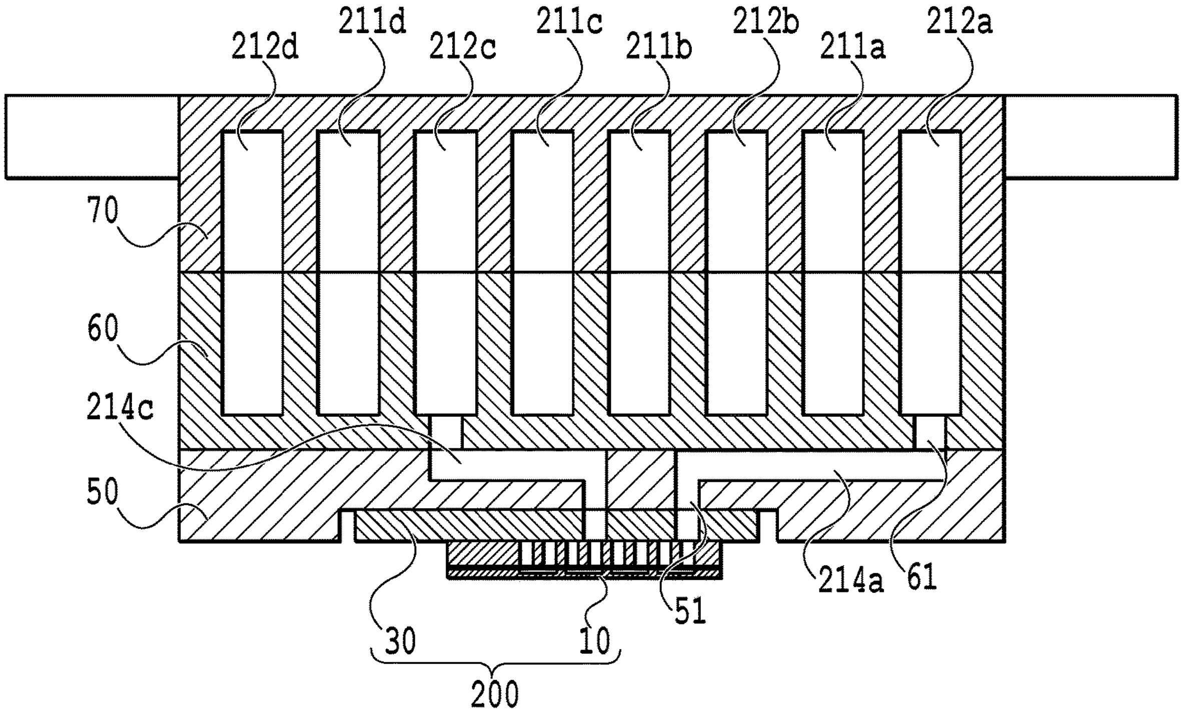
FIG. 8 is a cross-sectional view along the cross-sectional line VIII-VIII in FIG. 7.

FIG. 8 is a view illustrating a cross section along the VIII-VIII line in FIG. 7. As illustrated in FIG. 8, each of the individual collection flow passages (214*a* and 214*c*) communicates with the ejection module 200 via the communication port 51. Although only the individual collection flow passages (214*a* and 214*c*) are illustrated in FIG. 8, as illustrated in FIG. 7, the individual supply flow passages 213 communicate with the ejection module 200 in another cross section. In a support member 30 and the recording element board 10 included in each ejection module 200, flow passages for supplying the inks from the first flow passage member 50 to recording elements 15 (FIG. 10B) provided in the recording element board 10 are formed. Moreover, in the support member 30 and the recording element board 10, flow passages for partially or entirely collecting (flowing-back) the inks supplied to the recording elements 15 into the first flow passage member 50 are formed. In this example, the common supply flow passage 211 for each color is connected to the negative pressure control unit 230 (high pressure side) for the corresponding color via the liquid supply unit 220 and the common collection flow passage 212 is connected to the negative pressure control unit 230 (low pressure side) via the liquid supply unit 220. The negative pressure control unit 230 generates a differential pressure (pressure difference) between the common supply flow passage 211 and the common collection flow passage 212. Accordingly, in the liquid ejection head of the present embodiment in which the flow passages are connected as illustrated in FIGS. 7 and 8, a flow from the common supply flow passage 211 to the individual supply flow passages 213, to the recording element boards 10, to the individual collection flow passages 214, and to the common collection flow passage 212 is generated for each color.

<Ejection Module>

Figure 9A:
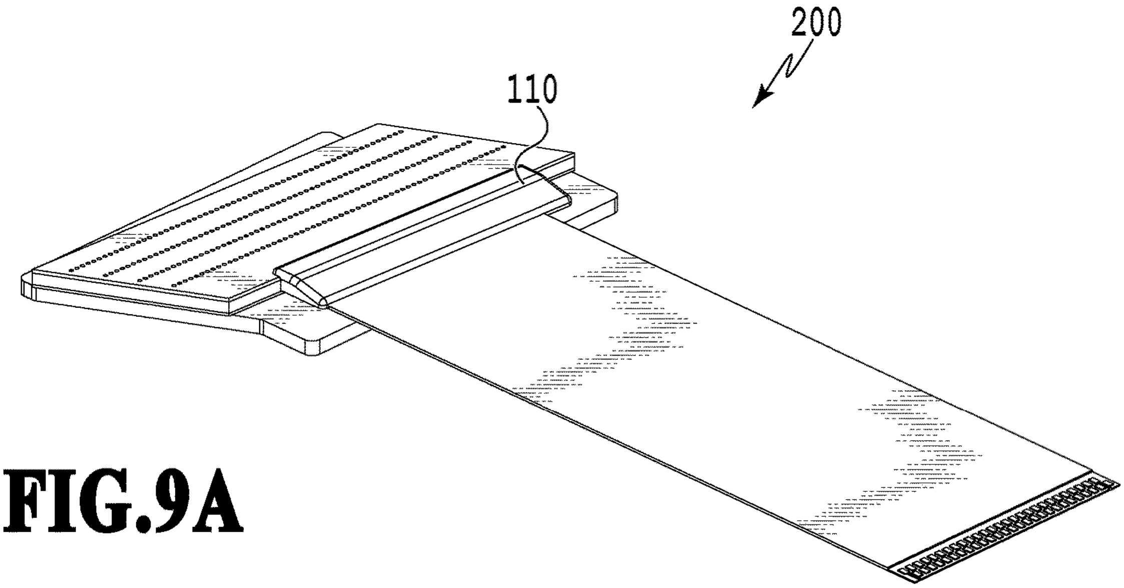
FIGS. 9A and 9B are views illustrating an ejection module.
Figure 9B:
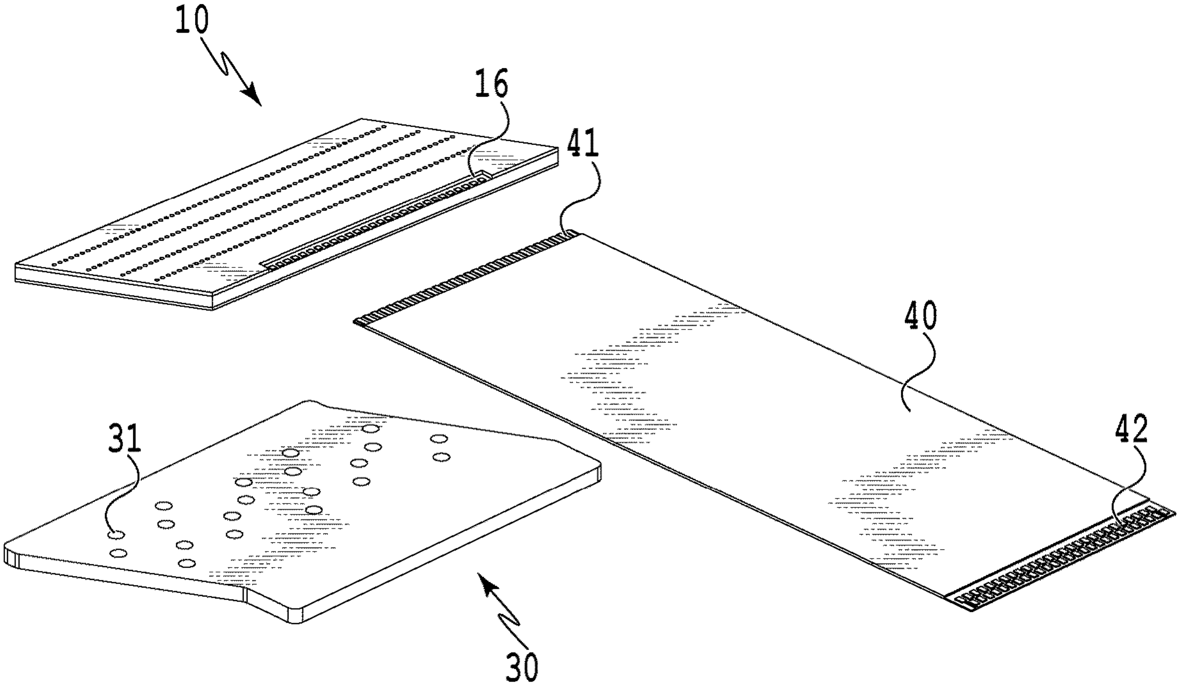

FIG. 9A illustrates a perspective view of one ejection module 200 and FIG. 9B illustrates an exploded view of this ejection module 200. As a method of manufacturing the ejection module 200, first, the recording element board 10 and the flexible wiring board 40 are bonded onto the support member 30 provided with liquid communication ports 31 in advance. Thereafter, a terminal 16 on the recording element board 10 and a terminal 41 on the flexible wiring board 40 are electrically connected to each other by wire bonding and then a wire-bonded portion (electric connecting portion) is covered with the sealing member 110 to be sealed. A terminal 42 of the flexible wiring boards 40 on the opposite side to the recording element board 10 is electrically connected to a connection terminal 93 (see FIG. 5) of the electric wiring board 90. Since the support member 30 is a support body that supports the recording element board 10 and is also a flow passage member that causes the recording element board 10 and the flow passage member 210 to fluidly communicate with each other, a member that has high flatness and that can be joined to the recording element board with sufficiently high reliability is preferable as the support member 30. The material of the support member 30 is preferably, for example, alumina or a resin material.

<Structure of Recording Element Board>

Figure 10A:
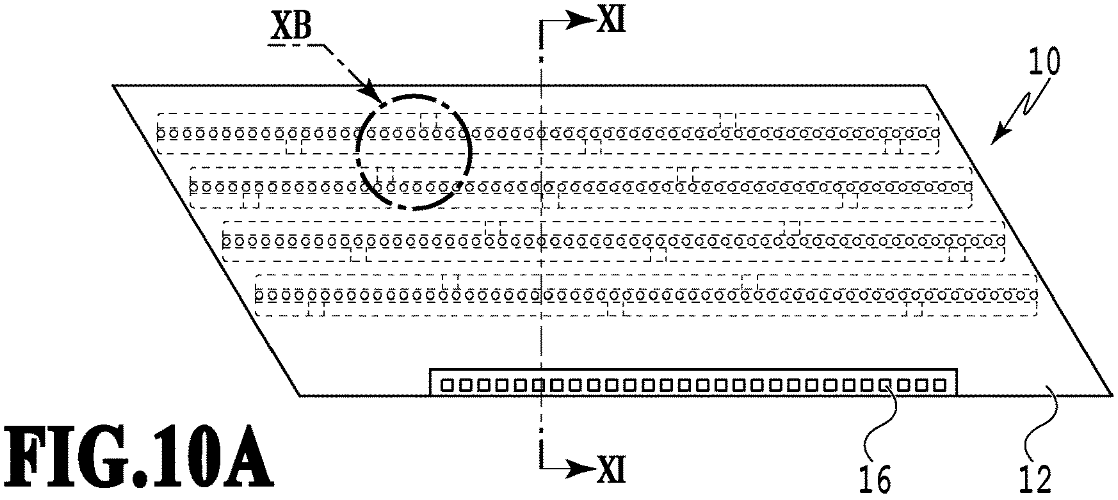
FIGS. 10A to 10C are views illustrating a structure of a recording element board.
Figure 10B:
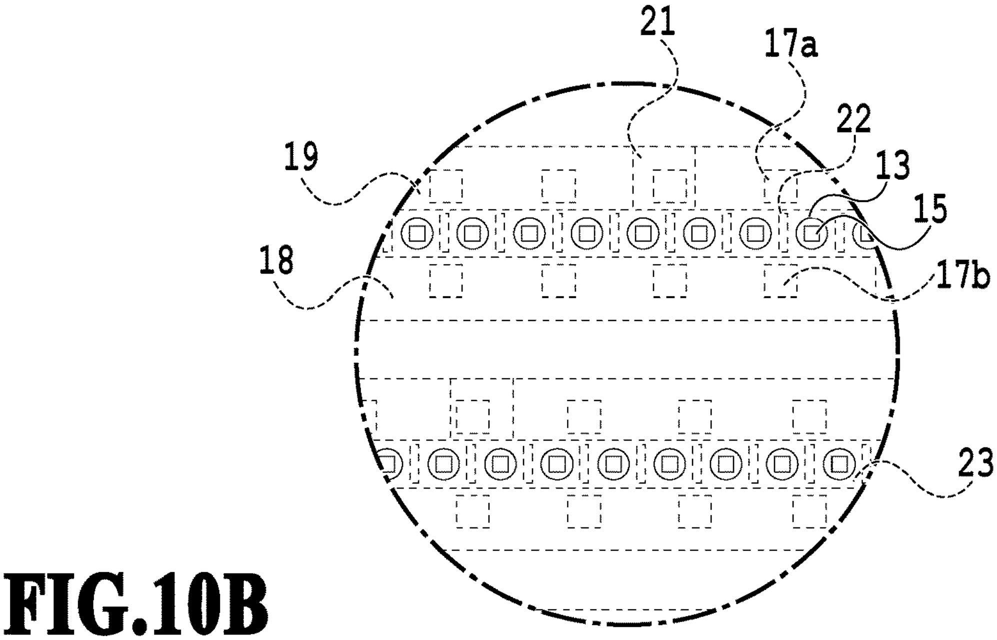
Figure 10C:
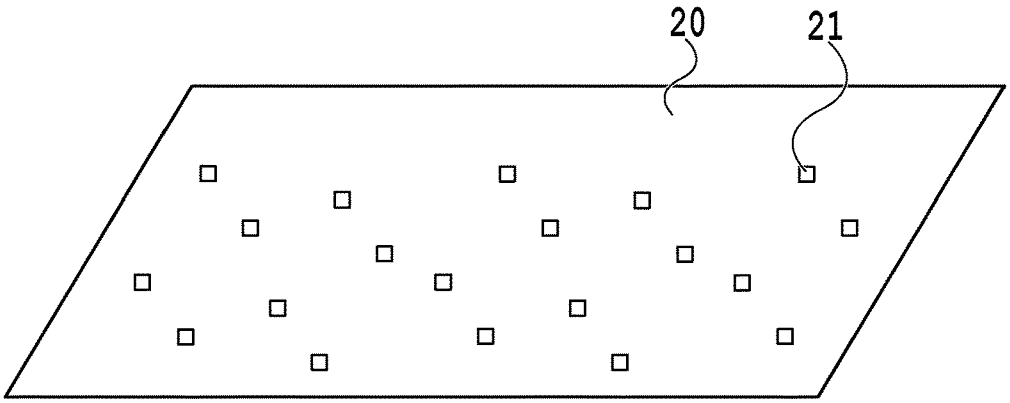
Figure 11:
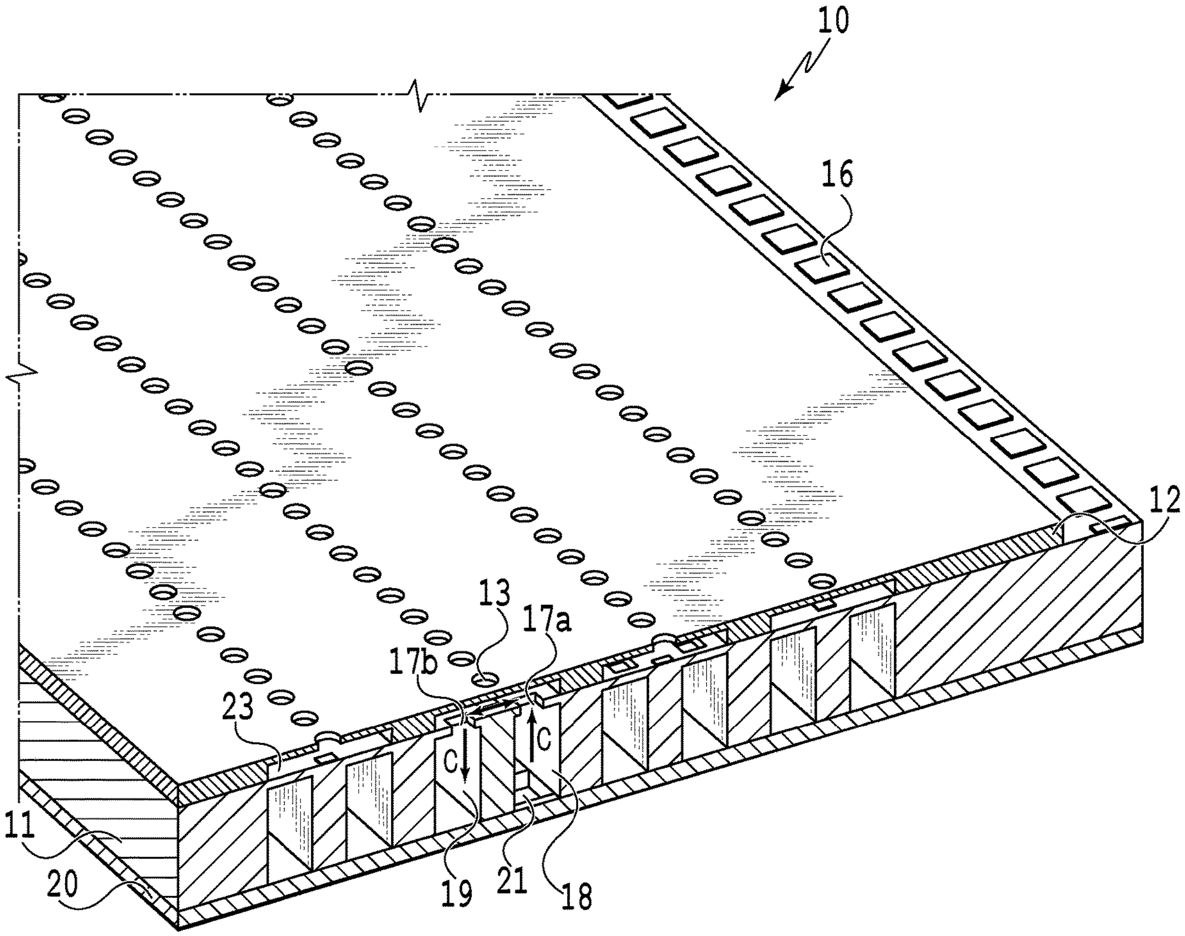
FIG. 11 is a perspective view illustrating structures of the recording element board and a lid member along the cross-sectional line XI-XI in FIG. 10A.

A configuration of the recording element board 10 in the present embodiment is described. FIG. 10A illustrates a plan view of a face of the recording element board 10 on the side where ejection ports 13 are formed, FIG. 10B illustrates an enlarged view of a portion denoted by XB in FIG. 10A, and FIG. 10C illustrates a plan view of the back side of FIG. 10A. FIG. 11 is a perspective view illustrating cross sections of the recording element board 10 and a lid member 20 along the cross-sectional line XI-XI illustrated in FIG. 10A. As illustrated in FIG. 10A, four ejection port rows corresponding to the respective ink colors are formed in an ejection port forming member 12 of the recording element board 10. Note that an extending direction of the ejection port rows in which the multiple ejection ports 13 are aligned is hereinafter referred to as "ejection port row direction".

As illustrated in FIG. 10B, the recording elements 15 that are heating elements configured to generate bubbles in the inks by means of thermal energy are arranged at positions corresponding to the respective ejection ports 13. Pressure chambers 23 including the recording elements 15 therein are sectioned by partitions 22. The recording elements 15 are electrically connected to the terminal 16 in FIG. 10A by electrical wiring (not illustrated) provided in the recording element board 10. The recording elements 15 generate heat and cause the inks to boil based on pulse signals received from a control circuit of the recording apparatus 1000 via the electric wiring board 90 (FIG. 5) and the flexible wiring board 40 (FIG. 9B). Force of bubbles generated by this boiling ejects the inks from the ejection ports 13. As illustrated in FIG. 10B, a liquid supply passage 18 extends along each ejection port row on one side thereof and a liquid collection passage 19 extends along the ejection port row on the other side thereof. The liquid supply passage 18 and the liquid collection passage 19 are flow passages provided in the recording element board 10 and extending in the ejection port row direction and communicate with each ejection port 13 via a supply port 17*a* and a collection port 17*b*, respectively.

As illustrated in FIGS. 10C and 11, the sheet-shaped lid member 20 is stacked on the back side of the face of the recording element board 10 on which the ejection ports 13 are formed, and multiple openings 21 that are described later and that communicate with the liquid supply passage 18 and the liquid collection passage 19 are provided in the lid member 20. In the present embodiment, three openings 21 are provided for one liquid supply passage 18 and two openings 21 are provided for one liquid collection passage 19 in the lid member 20. As illustrated in FIG. 10B, the openings 21 in the lid member 20 communicate with the multiple communication ports 51 illustrated in FIG. 7 and the like, respectively. As illustrated in FIG. 11, the lid member 20 has a function of a lid that forms part of walls of the liquid supply passage 18 and the liquid collection passage 19 formed in a substrate 11 of the recording element board 10. The lid member 20 is preferably an object that has sufficient corrosion resistance to the inks, and high accuracy is required for the opening shape and opening positions of the openings 21 from the viewpoint of preventing color mixing. Accordingly, it is preferable that a photosensitive resin material and a silicon plate are used as the material of the lid member 20 and the openings 21 are provided by a photolithography process. As described above, the lid member is a member that converts the pitch of the flow passages by using the openings 21, desirably has a small thickness considering pressure droplet, and is desirably formed of a film-shaped member.

Next, flow of the inks in the recording element board 10 is described. FIG. 11 is a perspective view illustrating the cross sections of the recording element board 10 and the lid member 20 along the cross-sectional line XI-XI in FIG. 10A. In the recording element board 10, the substrate 11 made of Si and the ejection port forming member 12 made of a photosensitive resin are stacked one on top of the other and the lid member 20 is joined to the back face of the substrate 11. The recording elements 15 are formed on one face of the substrate 11 (FIG. 10B) and grooves forming the liquid supply passage 18 and the liquid collection passage 19 extending along each ejection port row are formed on the back face of the substrate 11. The liquid supply passage 18 and the liquid collection passage 19 formed by the substrate 11 and the lid member 20 are connected respectively to the common supply flow passage 211 and the common collection flow passage 212 in the flow passage member 210 and a differential pressure is generated between the liquid supply passage 18 and the liquid collection passage 19. In the ejection ports that are not preforming the ejection operation while the ink is ejected from the multiple ejection ports 13 of the liquid ejection head 3 to perform recording, flow of the ink in the liquid supply passage 18 provided in the substrate 11 is flow illustrated by the arrows C in FIG. 11 due to this differential pressure. Specifically, the ink flows to the liquid collection passage 19 via the supply port 17*a*, the pressure chamber 23, and the collection port 17*b*. This flow allows bubbles, foreign objects, viscosity-increased ink generated by evaporation from the ejection ports 13, and the like to be collected into the liquid collection passage 19, in the ejection ports 13 and the pressure chambers 23 in which recording is paused. Moreover, it is possible to suppress an increase in the viscosity of the ink in the ejection ports 13 and the pressure chambers 23. The ink collected into the liquid collection passage 19 passes through the openings 21 of the lid member 20 and the liquid communication ports 31 (see FIG. 9B) of the support member 30 and is collected into the communication ports 51 in the flow passage member 210, the individual collection flow passages 214, and the common collection flow passage 212 in this order. The ink is eventually collected into a supply path of the recording apparatus 1000.

Specifically, the ink supplied from the recording apparatus main body to the liquid ejection head 3 flows in the following order to be supplied and collected. The ink first flows into an interior of the liquid ejection head 3 from the liquid connecting portion 111 of the liquid supply unit 220. Then, the ink is supplied to the joint rubber 100, to the communication port 72 and the common flow passage groove 71 provided in the third flow passage member, to the common flow passage groove 62 and the communication port 61 provided in the second flow passage member, and to the individual flow passage groove 52 and the communication port 51 provided in the first flow passage member in this order. Then, the ink is supplied to each pressure chamber 23 via the liquid communication port 31 provided in the support member 30, the opening 21 provided in the lid member, the liquid supply passage 18 provided in the substrate 11, and the supply port 17*a* in this order. The ink supplied to the pressure chamber 23 and not ejected from the ejection port 13 flows through the collection port 17*b* and the liquid collection passage 19 provided in the substrate 11, the opening 21 provided in the lid member, and the liquid communication port 31 provided in the support member 30 in this order. Then, the ink flows through the communication port 51 and the individual flow passage groove 52 provided in the first flow passage member, the communication port 61 and the common flow passage groove 62 provided in the second flow passage member, the common flow passage groove 71 and the communication port 72 provided in the third flow passage member 70, and the joint rubber 100 in this order. Furthermore, the ink flows to the outside of the liquid ejection head 3 from the liquid connecting portion 111 provided in the liquid supply unit. In the mode of the first circulation path illustrated in FIG. 2, the ink flowing in from the liquid connecting portion 111 passes the negative pressure control unit 230 and is then supplied to the joint rubber 100. In the mode of the second circulation path illustrated in FIG. 3, the ink collected from the pressure chamber 23 passes the joint rubber 100, then passes the negative pressure control unit 230, and flows to the outside the liquid ejection head from the liquid connecting portion 111.

Moreover, as illustrated in FIGS. 2 and 3, not all of the ink flowing in from the one end of the common supply flow passage 211 of the liquid ejection unit 300 is supplied to the pressure chambers 23 via the individual supply flow passages 213*a*. There is a portion of the ink that flows from the other end of the common supply flow passage 211 to the liquid supply unit 220 without flowing into the individual supply flow passages 213*a*. Providing a path through which the ink flows without passing the recording element boards 10 as described above can suppress backward-flow of the ink circulation flow even in the case where the recording element boards 10 including fine flow passages with large flow resistance are provided as in the present embodiment. As described above, since the liquid ejection head of the present embodiment can suppress an increase in the viscosity of the ink in portions near the pressure chambers and the ejection ports, it is possible to suppress non-ejection and deviation of an ejection direction from a normal direction and, as a result, perform high-quality recording.

<Positional Relationships Between Recording Element Boards>

Figure 12:
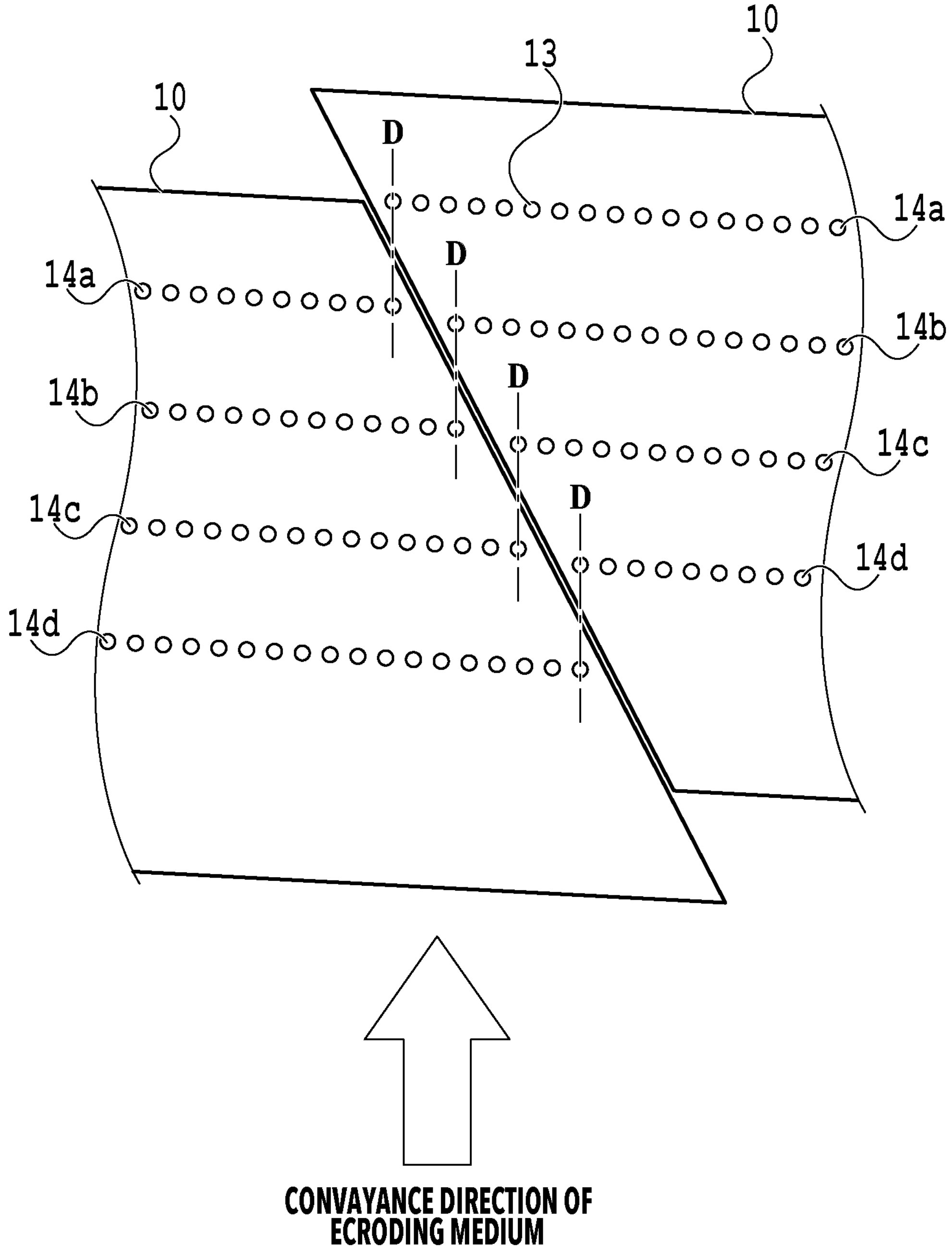
FIG. 12 is a plan view illustrating adjacent portions of the recording element boards in a partially enlarged manner.

FIG. 12 is a plan view illustrating adjacent portions of the recording element boards in two adjacent ejection modules in a partially enlarged manner. As illustrated in FIG. 10A and the like, recording element boards with a substantially parallelogram shape are used in the present embodiment. As illustrated in FIG. 12, in each recording element board 10, the ejection port rows (14*a* to 14*d*) in which the ejection ports 13 are aligned are arranged to be tilted at a certain angle with respect to the conveyance direction of the recording medium. In the ejection port rows in the adjacent portions of the respective recording element boards 10, at least two ejection ports thereby overlap each other in the conveyance direction of the recording medium. In FIG. 12, two ejection ports on each of D lines are in an overlapping relationship. Even in the case where the position of the recording element board 10 is misaligned from a predetermined position by a certain degree, this arrangement can make black stripes and blank areas in a recorded image less noticeable by performing drive control of the overlapping ejection ports. The configuration as in FIG. 12 can be achieved also in the case where the multiple recording element boards 10 are arranged on a straight line (in line) instead of a zigzag pattern. This can provide measures against black stripes and blank areas in overlap portions of the recording element boards 10 while suppressing an increase in the length of the liquid ejection head in the conveyance direction of the recording medium. Although the main flat surface of each recording element board has the parallelogram shape in this example, the present embodiment is not limited to this and the configuration of the present embodiment can be preferably applied also to the case where a recording element board with, for example, a rectangular shape, a trapezoidal shape, or any other shape is used.

<Control of Communication Between Liquid Ejection Head and Main Body>

Figure 13:
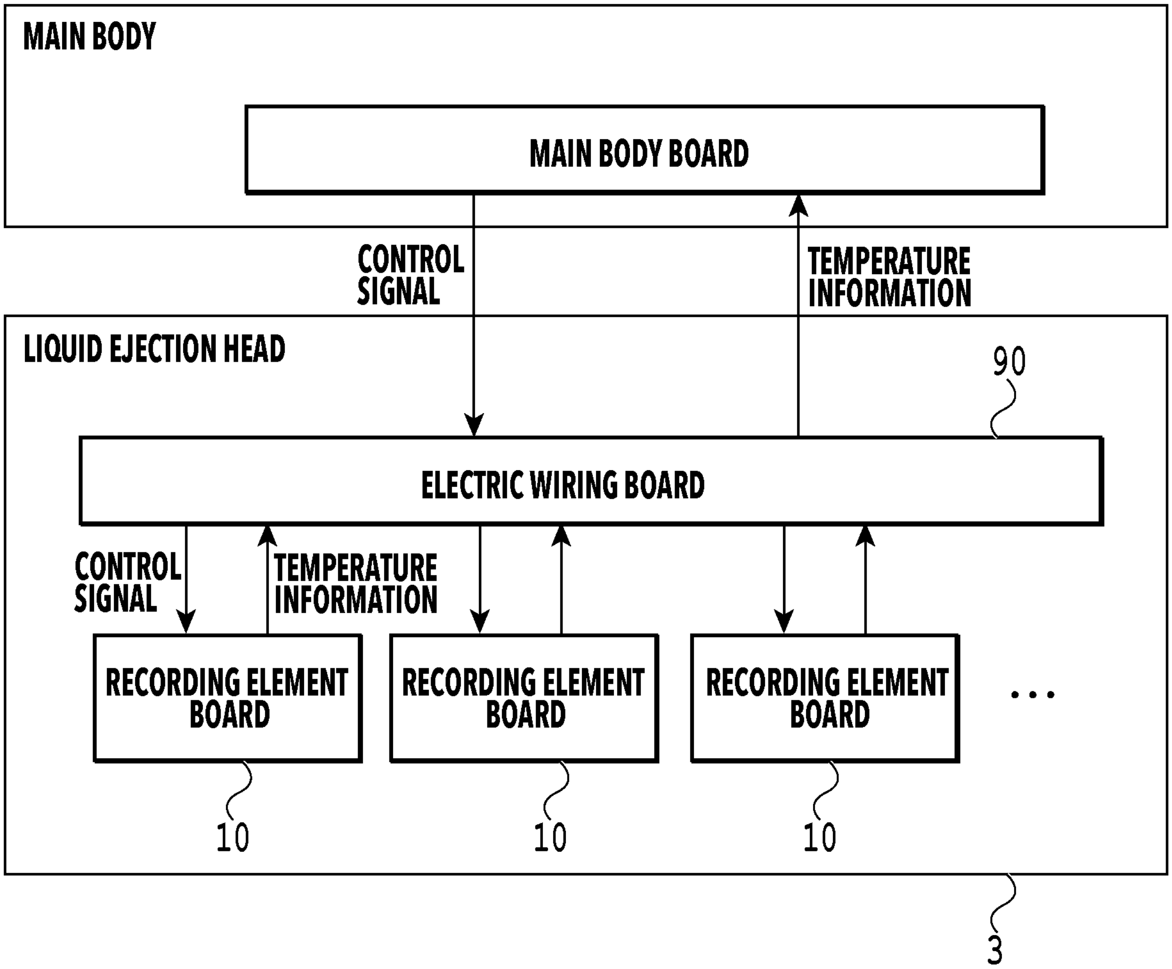
FIG. 13 is a diagram modeling communication between the liquid ejection head and a main body.

Control of communication between the liquid ejection head and the main body according to the present embodiment is described below by using FIG. 13. FIG. 13 is a diagram modeling the communication between the liquid ejection head and the main body. A main body board incorporated in the main body of the recording apparatus 1000 includes a CPU, a ROM, a RAM, and the like. Such a main body board receives information on temperature in each recording element board 10 from the liquid ejection head 3 and sends a control signal for driving the recording element board 10 to the electric wiring board 90 of the liquid ejection head 3, based on the received temperature information.

The control signal includes information (referred to as pulse information) on a pulse to be applied to each heating element in addition to various types of information such as the temperature information. For example, in Japanese Patent Laid-Open No. 2000-246899, a transmission timing T1 and a pulse width Pw1 of a first pulse signal and a transmission timing T2 and a pulse width Pw2 of a second pulse signal are sent as the pulse information. Meanwhile, in the present embodiment, only the transmission timing T1 and the pulse width Pw1 of the first pulse signal need to be sent as the pulse information and the data processing amount is small even in the case where voltage information is additionally added to the control information. Accordingly, the processing load can be reduced.

<Pulse Width of Pulse Signal and Ejection Speed of Ink Droplet>

In the present embodiment, in the bubble generation in the ink performed by the heating element to eject the ink from the ejection port, a greater effect can be expected in the case where the total heating period is 0.5 microseconds or less. The shorter the heating period in the bubble generation in the ink is, that is the greater the heat flux is, the more stable the bubble generation is and the smaller the variation in the ejection speed is. Since the bubble generation is more likely to be hindered particularly in an ink with a large amount of solid components, a pulse signal with a smaller pulse width is preferable for such an ink. However, the greater the heat flux is and the shorter the heating period is, the lower the ejection speed is.

Figure 14:
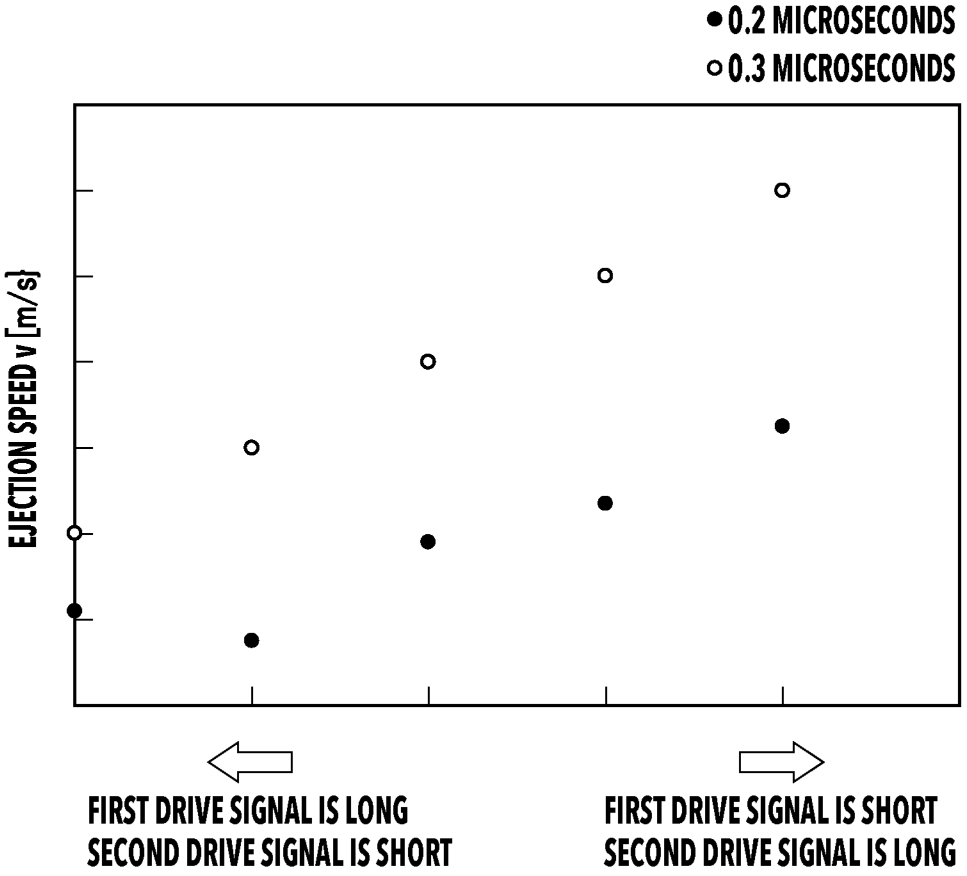
FIG. 14 is a graph illustrating an ejection speed in the case where the total heating period is divided into two periods and the divided periods are changed in various ways.

FIG. 14 is a graph of the ejection speed in the case where the total heating period is divided into two periods as in Japanese Patent Laid-Open No. 2000-246899 and the divided periods are changed in various ways. In the graph, data in the case where the total heating period is 0.2 microseconds is illustrated by black dots and data in the case where the total heating period is 0.3 microseconds is illustrated by white dots. In comparison of the data of 0.2 microseconds and the data of 0.3 microseconds, a modulation width of the ejection speed in the case where the total heating period is 0.2 microseconds is small, and there is possibility that modulation of the ejection speed is insufficient.

In the present embodiment, drive of the recording elements involving adjustment of a potential difference ΔV based on a condition and a configuration of the liquid ejection head (recording element boards) is performed while the total heating time is reduced as described below, and this enables correction of the ejection speed while suppressing fluctuation in the ejection. In this description, the condition of the liquid ejection head includes an amount of kogation in the recording element boards, the temperature of the element boards, an adsorption state of ink components, and the like as described later, and the configuration of the liquid ejection head includes the dimension of the ejection ports of the recording element boards as described later.

<Structure of Heat Applying Portion in Recording Element Board>

Figure 15A:
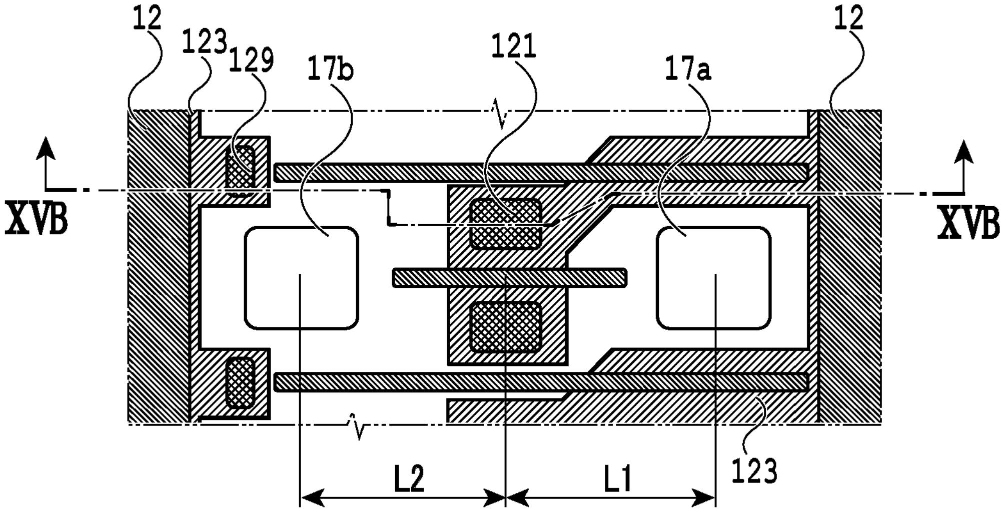
FIGS. 15A and 15B are views illustrating a structure of a heat applying portion in the recording element board.
Figure 15B:
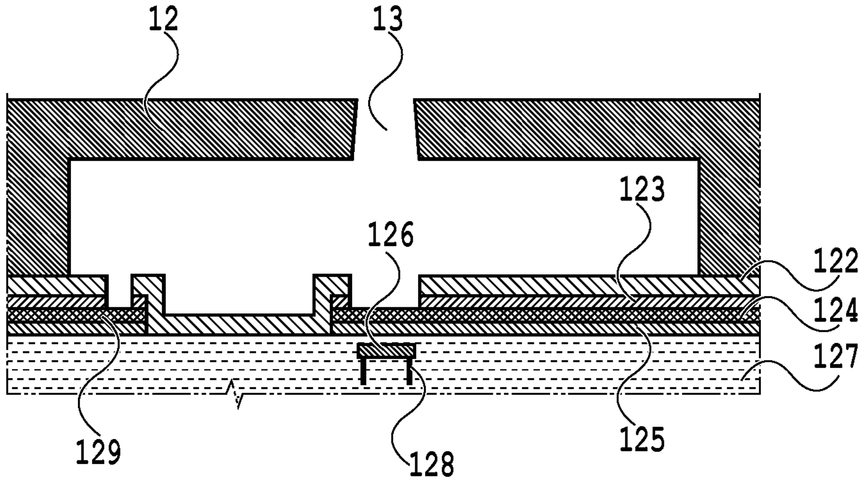

A structure of a heat applying portion in the recording element board according to the present embodiment is described below by using FIGS. 15A and 15B. FIG. 15A is a plan view schematically illustrating a region around the heat applying portion in the recording element board 10 in an enlarged manner. Moreover, FIG. 15B is a cross-sectional view along the one-dot chain line XVB-XVB in FIG. 15A.

The recording element board of the liquid ejection head is formed by stacking multiple layers one on top of another on a substrate made of silicon. In the present embodiment, a heat accumulating layer made of a thermally oxidized film, an SiO film, a SiN film, or the like is arranged on the substrate. Moreover, a heating resistive element 126 is arranged on the heat accumulating layer and an electrode wiring layer (not illustrated) serving as wiring made of a metal material such as Al, Al—Si, Al—Cu, or the like is connected to the heating resistive element 126 via a tungsten plug 128. As illustrated in FIG. 15B, an insulating protection layer 127 (first protection layer) is arranged on the heating resistive element 126. The insulating protection layer 127 is an insulating layer provided above the heating resistive element 126 to cover the heating resistive element 126. The insulating protection layer 127 is made of a SiO film, a SiN film, or the like.

A protection layer for blocking contact with liquid is arranged on the insulating protection layer 127. The protection layer includes a lower protection layer 125, an upper protection layer 124 (second protection layer), and an adhering protection layer 123. In the present embodiment, the lower protection layer 125 and the upper protection layer 124 are provided on the heating resistive element 126 and protect a surface of the heating resistive element 126 from chemical and physical impacts that occur with the heating of the heating resistive element 126.

In the present embodiment, the lower protection layer 125 is made of tantalum (Ta), the upper protection layer 124 is made of iridium (Ir), and the adhering protection layer 123 is made of tantalum (Ta). Moreover, the protection layers made of these materials are electively conductive. A protection layer 122 for improving adhesion to the ejection port forming member 12 is arranged on the adhering protection layer 123 as a liquid resistant body. The protection layer 122 is made of SiC.

In the case where the liquid is ejected, an upper portion of the upper protection layer 124 is in contact with the liquid and is in a harsh environment in which bubbles are generated by instantaneous temperature rise of the liquid in the upper portion and disappear in this portion to cause cavitation. Accordingly, in the present embodiment, the upper protection layer 124 made of an iridium material with high corrosion resistance and high reliability is formed and comes into contact with the liquid at a position corresponding to the heating resistive element 126.

The present embodiment employs the ink circulation configuration in which the liquid is supplied into the pressure chamber 23 from the supply port 17*a* and is collected into the collection port 17*b*. Accordingly, on the heating resistive element 126, the liquid flows in a direction from the supply port 17*a* on the upstream side toward the collection port 17*b* on the downstream side during printing.

Moreover, in the present embodiment, a kogation suppression process for suppressing kogation deposited on the upper protection layer 124 on the heating resistive element 126 is performed during the printing. Specifically, a portion of the upper protection layer 124 directly above the heating resistive element 126 is set as one electrode 121 (first electrode) and an opposing electrode 129 (second electrode) corresponding to the electrode 121 is provided to form an electric field through the liquid in a liquid chamber. Particles such as pigment charged to a negative potential in the liquid are thereby repelled from the surface of the upper protection layer 124 on the heating resistive element 126. Reducing the presence ratio of the particles such as pigment charged to a negative potential near the surface of the upper protection layer 124 as described above suppresses kogation deposited on the upper protection layer 124 on the heating resistive element 126 during printing. Such kogation suppression is performed in mind of the following fact: kogation is a phenomenon that occurs in the case where a color material, additives, and the like contained in the liquid are heated to high temperature to be decomposed at a molecular level, change to low-solubility substances, and are physically adsorbed onto the upper protection layer. Reducing the presence ratio of the color material, additives, and the like that cause kogation near the surface of the upper protection layer 124 on the heating resistive element 126 in the high-temperature heating of the upper protection layer 124 leads to suppression of kogation.

Figure 16A:
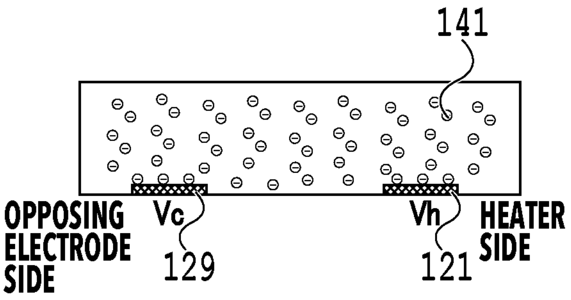
FIGS. 16A to 16C are views for explaining electric field control.

A mechanism of electric field control (also referred to as potential control and potential difference control) used in the present embodiment is described below by using FIGS. 16A to 16C. In FIG. 16A, the electrode 121 of the upper protection layer and the opposing electrode 129 are arranged in a bubbling chamber and the bubbling chamber is filled with the liquid. The liquid contains particles 141 such as pigment charged to a negative potential and the particles 141 are substantially evenly dispersed in the liquid.

Figure 16B:
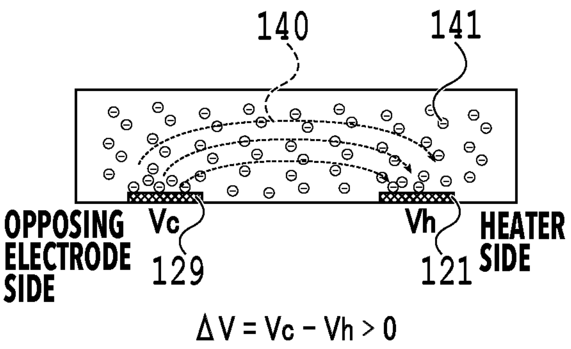

FIG. 16B illustrates a state where voltage application is such that voltage of the electrode 121 in the upper protection layer is lower than that of the opposing electrode 129 and, for example, a potential difference between the electrode 121 and the opposing electrode 129 is about 0.2 to 2.5 V. This is due to the following reason: assume that the upper protection layer 124 is made of iridium; in this configuration, electrochemical reaction between the electrode 121 and the liquid occurs in the case where the potential difference between both electrodes exceeds 2.5 V, and the surface of the electrode 121 dissolves into the liquid; accordingly, the potential level is preferably set to a level at which the electrode 121 does not dissolve. Specifically, the state in this case is such that, although an electric field 140 is formed between the electrode 121 in the upper protection layer and the opposing electrode 129 through the liquid, no current is flowing therebetween. Since the electrode 121 in the upper protection layer has a negative potential with respect to the opposing electrode 129, the particles 141 charged to the negative potential are repelled from the surface of the electrode 121 in the upper protection layer and the presence ratio of the particles 141 near the surface of the electrode 121 in the upper protection layer decreases.

Figure 16C:
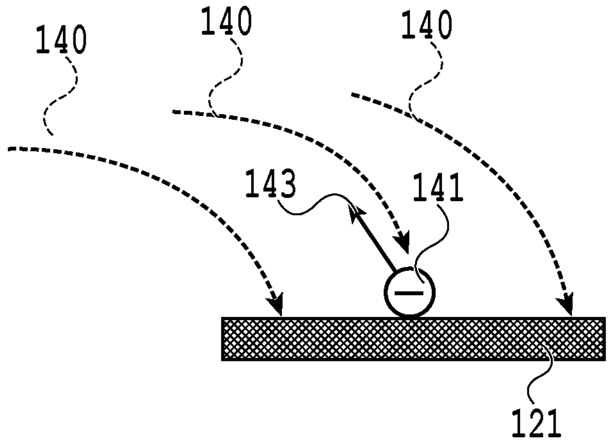

FIG. 16C is a schematic view in which a portion near the upper protection layer 124 illustrated in FIG. 16B is enlarged. The particles 141 charged to the negative potential receive repulsive force 143 from the surface of the upper protection layer 124 along lines of electric force of the electric field 140 formed in the liquid and are repelled. Specifically, in the case where the potential of the opposing electrode is represented by Vc and the potential of the upper protection layer electrode of the heater is represented by Vh, the larger the potential difference $\Delta V$ (=Vc−Vh) is, the more the particles 141 charged to the negative potential are repelled. Meanwhile, particles that are positively charged come closer to the heater. In the present embodiment, a negative charge is a factor that inhibits bubble generation and the larger the potential difference $\Delta V$ is, the higher the temperature of bubble generation is and the higher the ejection speed is.

Figure 17:
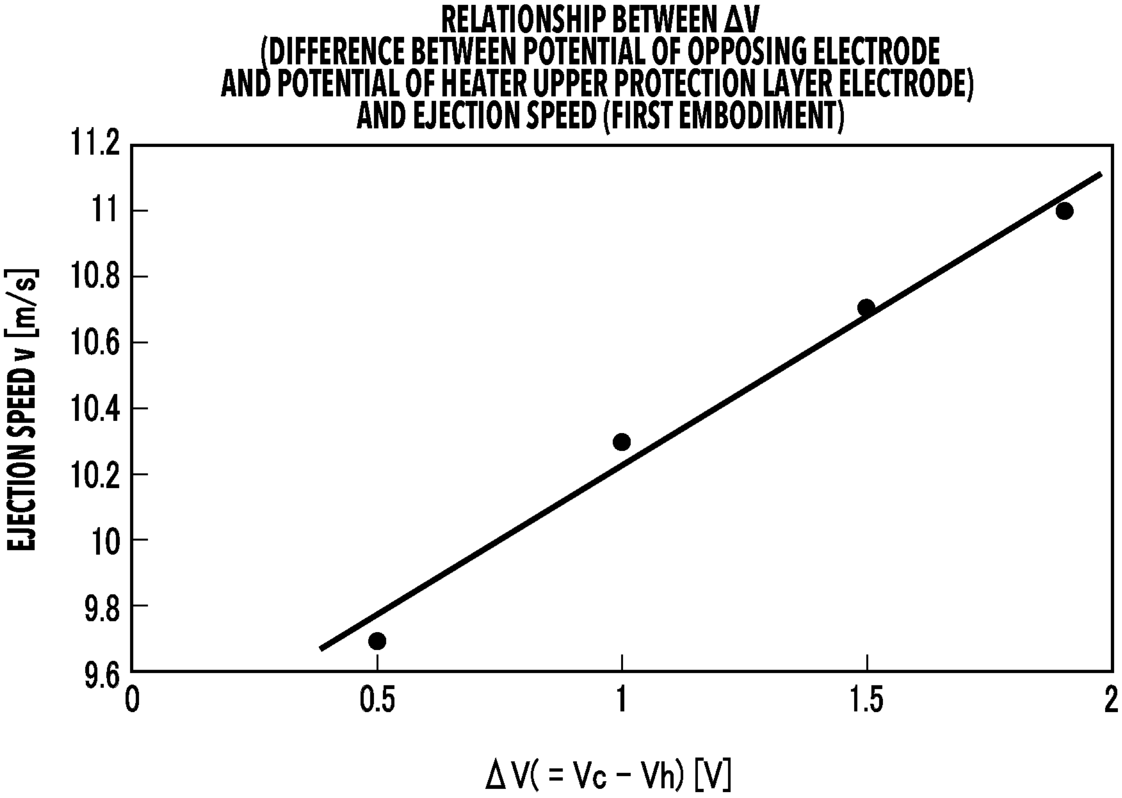
FIG. 17 is a graph illustrating a relationship between ΔV and the ejection speed.

FIG. 17 illustrates a relationship between $\Delta V$ and the ejection speed, specifically, measurement results of the ejection speed measured with $\Delta V$ varied in increments of 0.5 V. Note that, in this example, the measurement is performed with Vh fixed to 0V and Vc varied. As illustrated in FIG. 17, changing $\Delta V$ can change the ejection speed v. According to the mechanism introduced herein, in response to a change in the ejection speed caused by external factors, it is possible to correct the ejection speed by changing $\Delta V$ and suppress printing unevenness.

As described above, in the present embodiment, the ejection speed is corrected by changing $\Delta V$ to prevent the case where kogation on the heater surface changes the ejection speed and causes the print unevenness. Particularly, assume a case where multiple chips (recording element boards) are mounted in the liquid ejection head as in the present embodiment; in this configuration, in the case where the number of ejected droplets varies between the chips, the ejection speed and the ejection amount varies between the chips and unevenness between the chips may thus occur. In this description, the kogation on the heater surface is a substance formed as follows: since the heater surface reaches high temperature in the ejection, the ink is denatured and the component of the ink is deposited on the heater surface.

Figure 18:
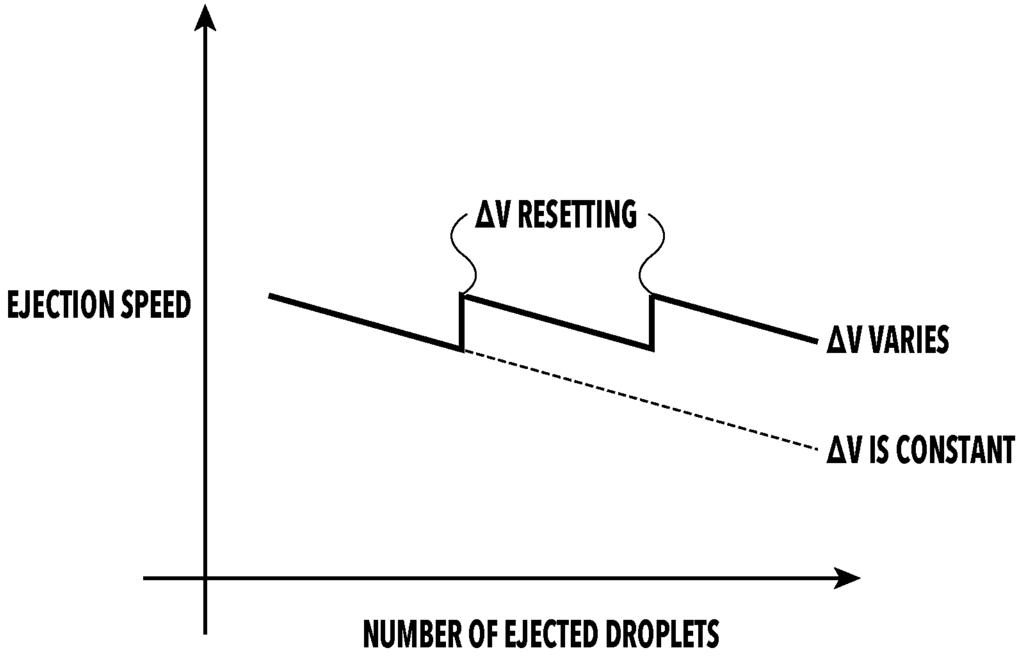
FIG. 18 is a graph illustrating a relationship between the number of ejected droplets and the ejection speed in a case where ΔV is constant or varies.

FIG. 18 illustrates a change in the ejection speed by the mechanism of the present embodiment. Specifically, the solid line illustrates a relationship between the number of ejected droplets and the ejection speed in the case where ΔV is reset in each operation (twice) and a broken line illustrates a relationship between the number of ejected droplets and the ejection speed in the case where ΔV is not reset.

The kogation of the ink on the heater surface inhibits bubble generation. Thus, in the case where ΔV is constant, as illustrated in FIG. 18, the ejection speed of the liquid droplets decreases as the number of ejected droplets increases. Accordingly, the ejection speed in the chip used for printing decreases while the ejection speed in the chip not used for printing does not. As a result, an ejection speed difference between the chips occurs and the unevenness occurs.

Accordingly, in the present embodiment, the potential difference ΔV (=Vc−Vh) in each chip is adjusted depending on an amount of kogation. Printing can be thereby performed with the ejection speeds of all chips maintained at values within a predetermined range. The potential difference ΔV may be adjusted by changing at least one of the potentials of the electrode 121 and the opposing electrode 129. Note that the kogation amount is preferably managed by using the number of ejected droplets (so-called dot count).

<Adjustment of Potential Difference ΔV Based on Dot Count>

Figure 19A:
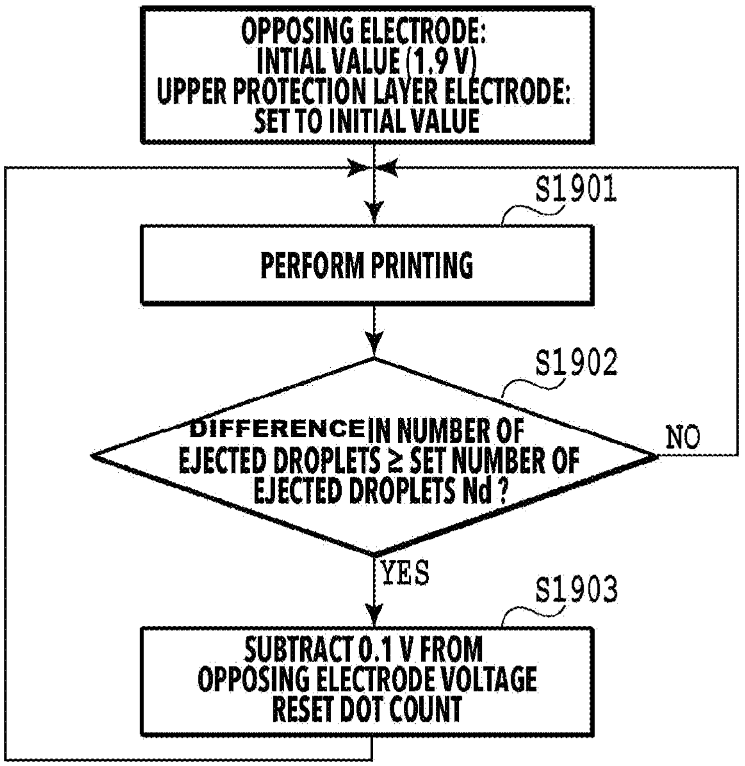
FIGS. 19A and 19B are sequence diagrams of a series of processes relating to adjustment of ΔV based on dot count.

FIG. 19A is a sequence diagram of a series of processes relating to the adjustment of the potential difference ΔV based on the dot count according to the present embodiment. In this example, an initial value of the potential of the upper protection layer electrode is 0.0 V and an initial value of the potential of the opposing electrode is about 1.9 V. Each of these initial values varies depending on the type of the ink and voltage at which the highest durability is achieved is set from the viewpoint of durability.

In step S1901, the recording apparatus 1000 performs printing. Note that, in the following description, "step S" is abbreviated as "S".

In S1902 subsequent to completion of the printing in S1901, the CPU of the recording apparatus 1000 performs dot count for each chip and obtains the number of ejected droplets in each chip. Then, the CPU derives a difference in the number of ejected droplets between the chip with the largest number of ejected ink droplets and each of the chips other than the chip with the largest number of ejected ink droplets, and determines whether or not the derived difference in the number of ejected droplets is equal to or larger than a predetermined threshold for each chip.

The processing proceeds to S1903 for the chips for which the determination result of S1902 is true. Meanwhile, the processing returns to S1901 for the chips for which the determination result of S1902 is false, and the next printing is continuously performed in the same setting. Note that the predetermined threshold used in S1902 is referred to as set number of ejected droplets Nd.

In S1903, the CPU of the recording apparatus 1000 resets the voltage of the opposing electrode for all chips for which the result is true in the latest determination of S1902. Specifically, the CPU sets the voltage to a value obtained by subtracting 0.1 V from the current value. Then, the CPU of the recording apparatus 1000 resets the dot counts of all chips and sets the dot count values (also referred to as the number of ejected droplets) to zero. Although the predetermined subtraction amount is set to 0.1 V in this example, the predetermined subtraction amount is not limited to 0.1 V and any value may be used.

In this series of processes, the potential differences in the chips other than the chip with the largest number of ejected ink droplets are adjusted according to a decrease in the ejection speed in the chip with the largest number of ejected ink droplets. This can align the ejection speed among the chips and suppress a decrease in printing quality.

Note that the liquid ejection head in the present embodiment is a liquid ejection head that performs printing by using the inks of four colors of CMYK and each of the initial value of the potential of the opposing electrode and the set number of ejected droplets Nd of the dot count to be used may be the same for all ink colors or may vary among the ink colors.

Figure 20A:
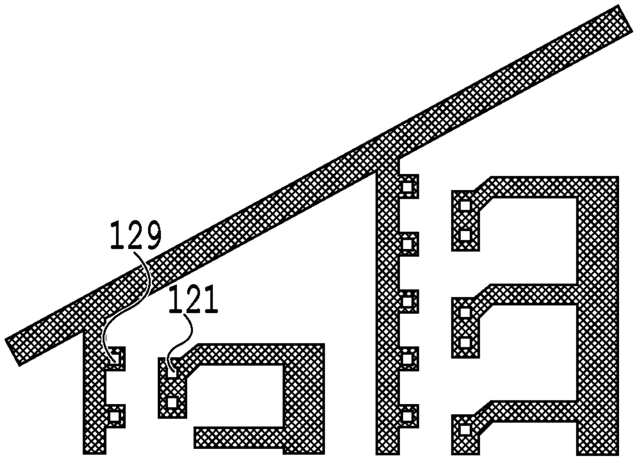
FIGS. 20A and 20B are views illustrating wiring in the recording element board.
Figure 20B:
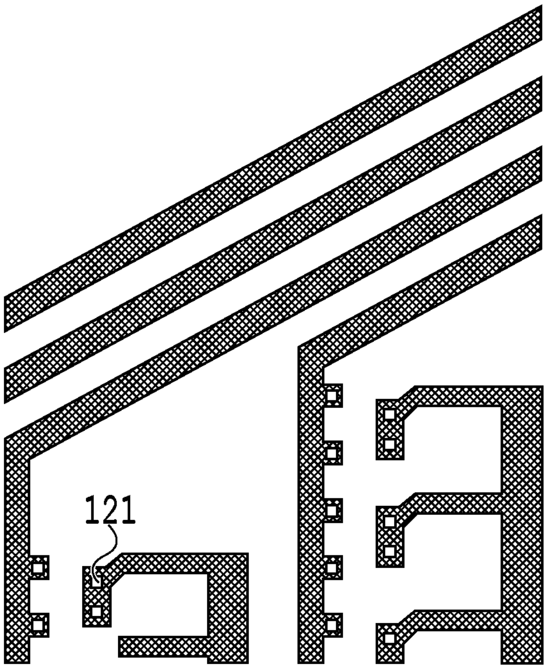

Moreover, the potential difference ΔV may be commonly set for all ink colors or may be settable for each ink color. FIG. 20A illustrates a board in which wiring is shared among all rows such that the same potential difference ΔV is set for all rows and FIG. 20B illustrates a board in which wiring is provided for each rows. In the case where the structure illustrated in FIG. 20A is employed, the size of the chip can be reduced. Meanwhile, in the case where the structure illustrated in FIG. 20B is employed, ΔV suitable for each ink color can be set by assigning wiring for each ink colors. For example, for an ink color in which the kogation tends to occur, the set number of ejected droplets Nd is set to a small value and the speed is finely adjusted. The print quality can be thereby improved.

Second Embodiment

In the present embodiment, an ejection speed change caused by a temperature change in the head is countered by using the same mechanism as that in the first embodiment. Note that, in the description of the following embodiments, differences from the previously-described embodiment are mainly described and description of the same contents as those in the previously-described embodiment are omitted as appropriate.

Figure 21:
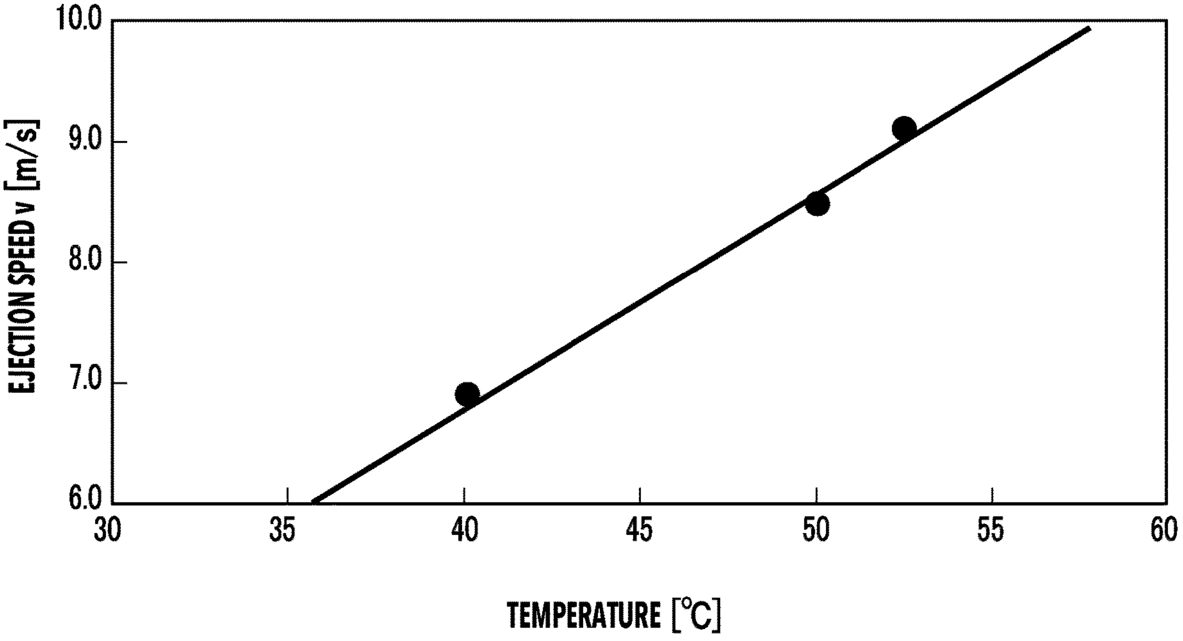
FIG. 21 is a graph illustrating a relationship between temperature and the ejection speed.

In an inkjet recording apparatus that ejects ink droplets by using thermal energy, the higher the temperature is, the higher the ejection speed is. FIG. 21 illustrates an example of an ejection speed change in the case where the temperature is actually changed. Since the ejection speed may change due to a temperature change as described above, the printing needs to be performed with the temperature maintained constant. However, in an inkjet recording apparatus that performs printing at high speed, the temperature changes due to temperature changes caused by the head such as an increase in temperature due to ejection of ink droplets and cooling due to ink supply as well as various factors such as cooling due to air flow of paper feeding and an increase in the main body temperature for high-speed evaporation of the ink. Accordingly, it is necessary to perform the printing while correcting the ejection speed that changes due to a temperature change in the recording head.

The present embodiment is characterized in that the temperature is measured with a temperature sensor such as a diode mounted in the head and printing is performed with the potential difference adjusted based on the measured temperature. FIG. 22 illustrates an example of a table (referred to as ΔV changing table) in which values of the potential difference ΔV are held. The ΔV changing table holds values of the potential difference ΔV to be updated to and used in the case where the temperature obtained as a result of the measurement with the temperature sensor changes from set temperature (referred to as reference temperature) being a reference. "Potential control reference value" described in FIG. 22 is a reference value of the potential difference ΔV set in the case where the first embodiment is applied and, in this example, four values (0.5, 1.0, 1.5, and 2.0) are assumed to be used as the potential control reference value. Note that specific numerical values held in this table vary depending on the type of ink.

For example, assume a case where the reference temperature is set to 40° C., the potential control reference value is set to 1.0 V, and temperature of 42° C. is obtained as a result of the measurement with the temperature sensor. In this case, 0.7 V may be set as the corrected potential difference ΔV (=Vc−Vh).

Figure 23:
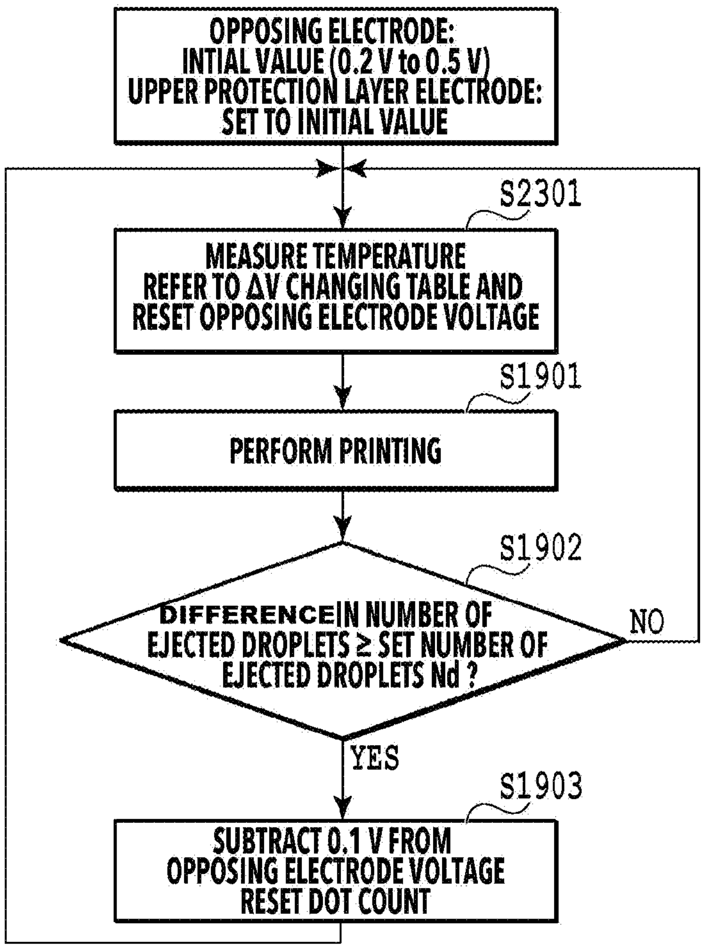
FIG. 23 is a sequence diagram of a series of processes relating to ΔV adjustment based on the temperature and the dot count.

FIG. 23 is a sequence diagram of a series of processes relating to the ΔV adjustment based on the temperature and the dot count according to the present embodiment.

In this example, the initial value of the potential of the upper protection layer electrode is assumed to be 0.0 V and the initial value of the potential of the opposing electrode is assumed to be about 0.2 to 0.5 V.

As illustrated in FIG. 23, in the present embodiment, in S2301 before printing, the CPU of the recording apparatus 1000 measures the temperature by using the temperature sensor mounted in the recording apparatus 1000 and derives a difference between the temperature obtained in the temperature measurement and the reference temperature. Then, the CPU of the recording apparatus 1000 refers to the ΔV changing table illustrated in FIG. 22 to obtain the value of ΔV corresponding to the derived difference and resets the voltage of the opposing electrode to the obtained value.

S1901 to S1903 subsequent to S2301 are the same as those in the first embodiment (refer to FIG. 19A). Although the temperature measurement is performed before the printing in this explanation as an example, the temperature measurement may be performed during the printing.

As described above, according to the present embodiment, the ejection speed correction depending on the temperature change is possible.

Third Embodiment

In the present embodiment, the potential control reference value is corrected based on a temperature change caused by ejection in a case where a mechanism similar to that in the first or second embodiment is used. In an inkjet recording apparatus that ejects ink droplets by using thermal energy, the larger the number of ink droplets ejected simultaneously is, the more the temperature near the ejection ports increases. Since the temperature rapidly changes (increases) with the ejection of the ink, it is preferable to estimate the temperature change in advance based on print data and correct the ejection speed in advance.

An example of the estimation of the temperature change based on the print data according to the present embodiment is described below. In this section, a mode in which a temperature increase is estimated based on the number of simultaneously-ejected droplets in the ejection port row is described as an example. Note that, in the case where the number of simultaneously-ejected droplets is calculated in the unit of ejection port row, the potential control reference value is corrected based on a proportion (hereinafter, referred to as duty) of the number of ejection ports performing the ejection in the ejection port row.

FIG. 24 illustrates an example of a ΔV changing table according to the present embodiment. The ΔV changing table holds values of the potential difference ΔV corresponding to each of duty values (0 to 100%). The potential control reference value that is voltage (potential difference) to be a reference in this example is the value of voltage obtained in the first or second embodiment and is assumed to be any of four values (0.5, 1.0, 1.5, and 2.0) in FIG. 24.

A specific example of a method of using the ΔV changing table is described. For example, in the case where the ejection port row is formed of 100 ejection ports and the number of simultaneously-ejected droplets is 80, the duty is 80%. In the case where the potential control reference value is 1 V in this situation, ΔV may be set to 0.8 V by using the table of FIG. 24.

Figure 25:
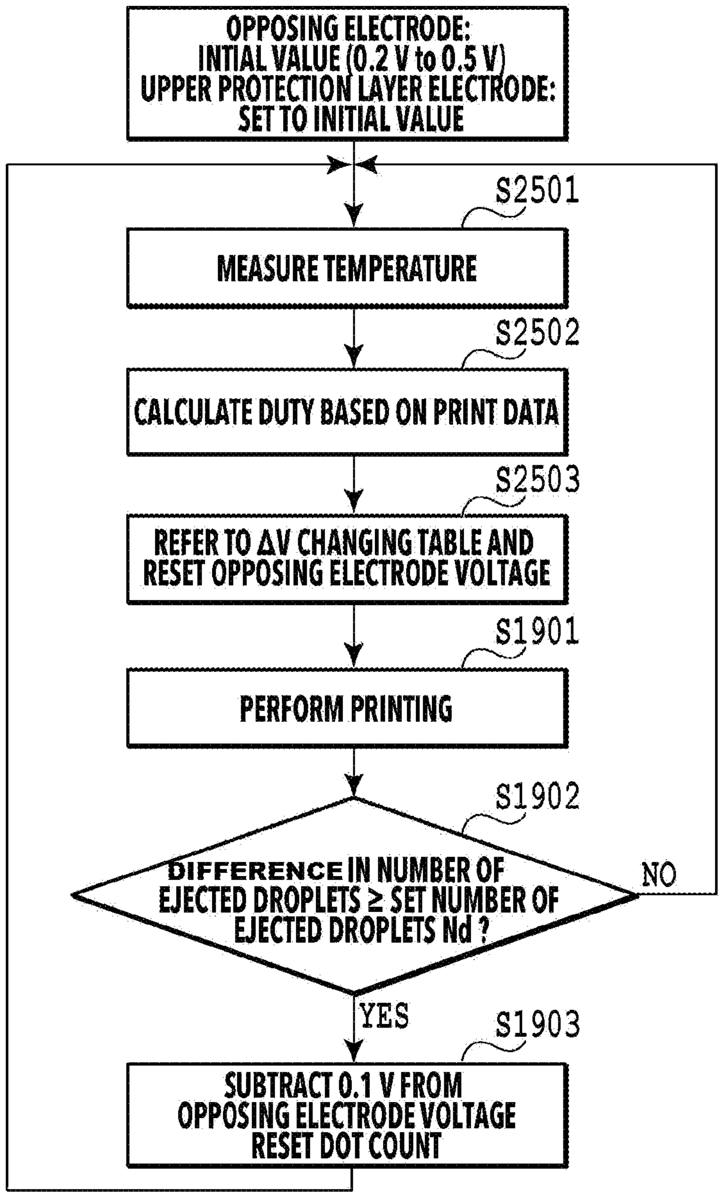
FIG. 25 is a sequence diagram of a series of processes relating to ΔV adjustment based on the temperature, a duty, and the dot count.

FIG. 25 is a sequence diagram of a series of processes relating to ΔV adjustment based on the temperature, the duty, and the dot count according to the present embodiment.

In S2501, the CPU of the recording apparatus 1000 measures the temperature by using the temperature sensor mounted in the recording apparatus 1000.

In S2502, the CPU of the recording apparatus 1000 calculates the duty based on the print data.

In S2503, the CPU of the recording apparatus 1000 derives the difference between the reference temperature and the temperature obtained in the latest measurement of S2501. Then, the CPU of the recording apparatus 1000 refers to the ΔV changing table illustrated in FIG. 22 and derives a value of ΔV (referred to as first correction value) corresponding to this difference as in the second embodiment. Then, the CPU of the recording apparatus 1000 further refers to the ΔV changing table illustrated in FIG. 24 and derives a value of ΔV (referred to as second correction value) corresponding to the derived first correction value. Finally, the CPU of the recording apparatus 1000 resets the voltage of the opposing electrode to the second correction value.

S1901 to S1903 subsequent to S2503 are the same as those in the first embodiment (see FIG. 19A).

As described above, according to the present embodiment, the electrode potential depending on the temperature change near the ejection ports is set by changing ΔV based on the duty. This enables correction of the ejection speed depending on the rapid temperature change near the ejection ports caused by printing and can improve the print quality. Although the number of simultaneously-ejected droplets in each ejection port row is calculated in the present embodiment as described above, the number of simultaneously-ejected droplets in the entire chip or the entire head may be calculated. Alternatively, the configuration may be such that the ejection port row is divided into multiple blocks and the number of simultaneously-ejected droplets in each block is calculated.

Fourth Embodiment

Figure 26:
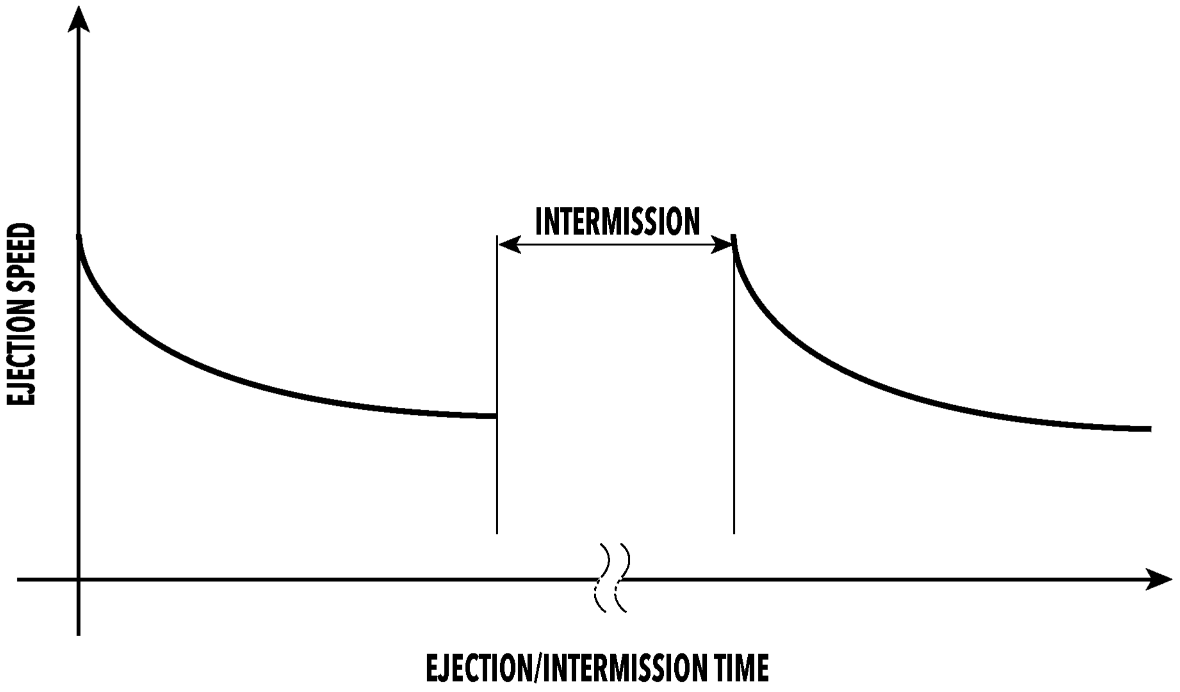
FIG. 26 is a graph illustrating a relationship between elapsed time and the ejection speed in the case where continuous ink ejection is temporarily paused.

The present embodiment is characterized in that, in the case where ink droplets are successively ejected, the potential difference ΔV is set depending on the number of ejected droplets. The reason for setting ΔV depending on the number of ejected droplets as described above is as follows: as illustrated in FIG. 26, the ejection speed of the ink droplets in the case where ink droplets are successively ejected is high in an initial stage and gradually decreases and this decrease needs to be countered. Moreover, as illustrated in FIG. 26, although the ejection speed temporarily increases again in the case where ejection is stopped for a while, the ejection speed decreases over time in the case where the ejection continues. The reason for this is assumed to be as follows: an ink component is adsorbed to interfaces with the ejection port and the upper protection film in non-ejection and bubble generation thus becomes unstable. In order to solve such problems, in the present embodiment, the potential difference ΔV is set depending on the number of successively-ejected droplets.

FIG. 27 illustrates an example of a ΔV changing table according to the present embodiment. The ΔV changing table holds values of the corrected potential difference ΔV corresponding to each of values (10 to 500) of the number of successively-ejected droplets. Note that the number of successively-ejected droplets according to the present embodiment refers to the number of ink droplets successively ejected after a lapse of predetermined intermission time (specifically, about 0.1 seconds). Moreover, the potential control reference value that is voltage (potential difference) to be a reference in the present embodiment is the value of voltage obtained in any of the first to third embodiments and is assumed to be any of four values (0.5, 1.0, 1.5, and 1.9) in the example of FIG. 27.

A specific example of a method of using the ΔV changing table is described. For example, in the case where the number of successively-ejected droplets is 100 and the potential control reference value is 1 V, ΔV may be set to 0.85 V by using the table of FIG. 27.

In a setting sequence of ΔV according to the present embodiment, the number of successively-ejected droplets and the intermission time are calculated based on the print data before printing as in the third embodiment (see FIG. 25). Then, a corrected ΔV is derived based on the calculated number of successively-ejected droplets and intermission time, by using the ΔV changing table as illustrated in FIG. 27 and the voltage of the opposing electrode is set according the derived, corrected ΔV.

As described above, in the present embodiment, ΔV is changed based on the number of successively-ejected droplets. This enables setting of the electrode potential depending on the adsorption state of the ink component and can improve the print quality.

Fifth Embodiment

The present embodiment is characterized in that an inter-chip potential difference is provided based on the dimension of the ejection ports configured to eject the ink. The ejection speed may vary depending on the dimension of the ejection port and this dimension may vary within a manufacturing tolerance. The larger the diameter of the ejection port is, the larger the amount of liquid to be ejected is and thus the lower the ejection speed is. Accordingly, the ejection speed needs to be corrected based on the dimension of the ejection port.

The correction of the ejection speed according to the present embodiment can be executed by directly measuring an ejection dimension and the ejection speed in inspection performed in shipping of the recording apparatus 1000. Alternatively, the correction can be also executed by printing a predetermined ruled line pattern and estimating an ejection speed difference between the chips based on an output result. Providing a potential difference such that the ejection speed difference between the chips is corrected enables printing while correcting the ejection speed variation due to dimensional unevenness between the chips.

Sixth Embodiment

Figure 28:
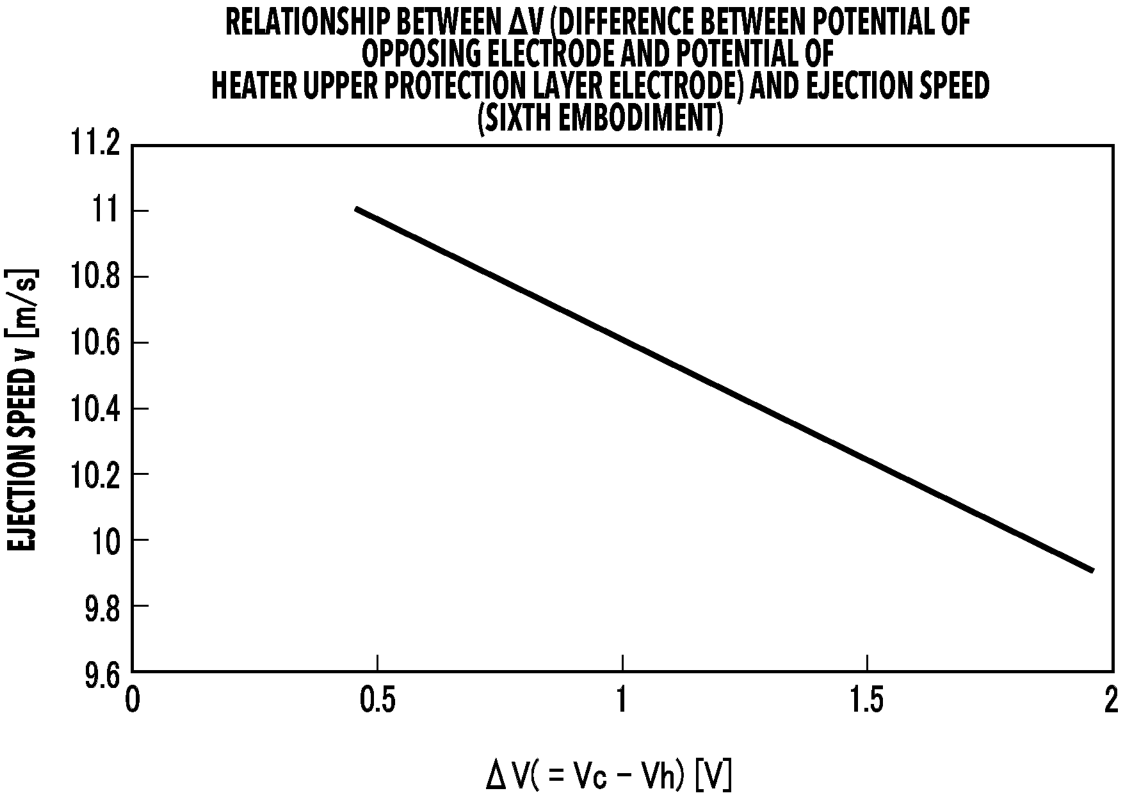
FIG. 28 is a graph illustrating a relationship between ΔV and the ejection speed.

The present embodiment is a mode applied to a case (FIG. 28) where the ejection speed monotonically decreases with an increase in the potential difference ΔV (=Vc−Vh) between the potential Vc of the opposing electrode and the potential Vh of the upper protection layer electrode in the heater. As described in the first embodiment, particles that inhibit bubble generation are generally negatively-charged particles but are positively-charged particles in rare cases. In such a case, the more positive the potential of the upper protection layer electrode in the heater is set with respect to the opposing electrode, the more likely the positively-charged particles are attracted onto the upper protection layer, and the ejection speed thus decreases.

Accordingly, in the present embodiment, in the case where the ejection speed is to be increased, the potential difference ΔV (=Vc−Vh) between the potential Vc of the opposing electrode and the potential Vh of the upper protection layer electrode in the heater is set to a smaller value. Meanwhile, in the case where the ejection speed is to be reduced, the potential difference ΔV is set to a larger value. In the case of performing such setting, the voltage may be determined by estimating the kogation amount by using the dot count as in the first embodiment or determined by using the temperature as in the second embodiment.

Figure 19B:
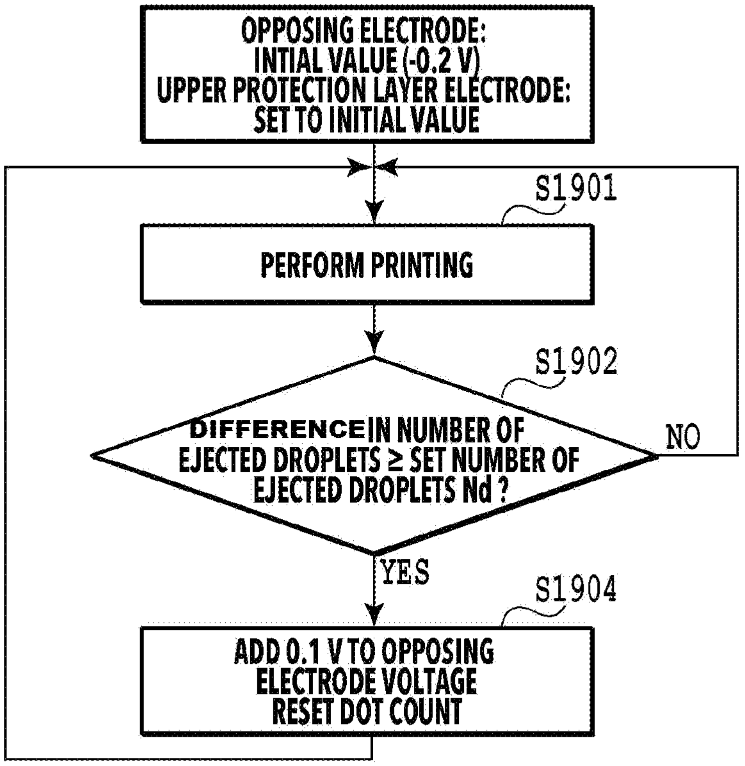

A sequence using the dot count as in the first embodiment is illustrated in FIG. 19B as an example. In this example, the initial value of the potential of the upper protection layer electrode is 0.0 V and the initial value of the potential of the opposing electrode is −0.2 V.

In S1901, the recording apparatus 1000 performs printing.

In S1902 subsequent to completion of the printing in S1901, the CPU of the recording apparatus 1000 performs dot count for each chip and obtains the number of ejected droplets in each chip. Then, the CPU derives a difference in the number of ejected droplets between the chip with the largest number of ejected ink droplets and each of the chips other than the chip with the largest number of ejected ink droplets, and determines whether or not the derived difference in the number of ejected droplets is equal to or larger than a predetermined threshold for each chip.

The processing proceeds to S1904 for the chips for which the determination result of S1902 is true. Meanwhile, the processing returns to S1901 for the chips for which the determination result of S1902 is false, and the next printing is continuously performed in the same setting. Note that the predetermined threshold used in S1902 is referred to as set number of ejected droplets Nd.

In S1904, the CPU of the recording apparatus 1000 resets the voltage of the opposing electrode for all chips for which the result is true in the latest determination of S1902. Specifically, the CPU sets the voltage to a value obtained by adding 0.1 V to the current value. Then, the CPU of the recording apparatus 1000 resets the dot counts of all chips and sets the dot count values to zero. Although the predetermined addition amount is set to 0.1 V in this example, the predetermined addition amount is not limited to 0.1 V and any value may be used.

According to the present embodiment, the ejection speed can be adjusted based on the dot count as in the first embodiment also in the case of using an ink in which bubbling inhibition due to positively-charged particles occurs.

Note that the contents of the first to sixth embodiment may be used in combination as appropriate.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can provide a technique of suppressing unevenness with lower control load than that in a conventional technique.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-113311, filed Jul. 8, 2021, which is hereby incorporated by reference herein in its entirety.

What is claimed is:

1. A liquid ejection apparatus comprising:

a liquid ejection head including a plurality of element boards each comprising (1) a conversion element that generates energy required to eject liquid, (2) a first protection layer that blocks contact between the conversion element and the liquid, (3) a second protection layer that partially covers the first protection layer and functions as a first electrode, (4) a second electrode that is electrically connected to the first electrode through the liquid, and (5) an ejection port that ejects the liquid; and a control unit configured to control a potential difference between the first electrode and the second electrode in printing to a predetermined value by changing at least one of potentials of the first electrode and the second electrode, wherein the control unit sets the potential difference based on at least one of a condition and a configuration of the liquid ejection head, wherein the control unit is capable of setting the potential difference for each of the element boards;

a count unit configured to count the number of ejected droplets of the liquid for each of the element boards;

a deriving unit configured to derive a difference in the number of ejected droplets between the element board with the largest number of ejected droplets and each of the element boards other than the element board with the largest number of ejected droplets; and a determination unit configured to determine whether or not the difference in the number of ejected droplets is equal to or larger than a predetermined threshold for all of the element boards other than the element board with the largest number of ejected droplets, wherein the control unit sets the potential of the second electrode to a value obtained by performing subtraction on a current value, for the element board for which a determination result provided by the determination unit is true.

2. The liquid ejection apparatus according to claim 1, wherein the control unit is capable of resetting the potential difference during the printing.

3. The liquid ejection apparatus according to claim 2, wherein the first electrode is a portion of the second protection layer that is directly above the conversion element.

4. The liquid ejection apparatus according to claim 1, further comprising a measurement unit configured to measure temperature, wherein the control unit sets the potential difference based on a difference between a reference temperature and the temperature obtained by the measurement unit.

5. The liquid ejection apparatus according to claim 1, wherein the control unit sets the potential difference based on a duty of print data.

6. The liquid ejection apparatus according to claim 1, wherein the control unit sets the potential difference based on the number of successively-ejected droplets that is the number of successively-ejected droplets of the liquid.

7. The liquid ejection apparatus according to claim 1, wherein the control unit sets the potential difference based on a dimension of the ejection port.

8. The liquid ejection apparatus according to claim 1, wherein the first protection layer has an insulating property.

9. The liquid ejection apparatus according to claim 1, wherein the liquid is inks, and wherein the control unit performs the control for each of colors of the inks.

10. A control method of a liquid ejection apparatus, the liquid ejection apparatus including: (A) a liquid ejection head including a plurality of element boards each comprising (1) a conversion element that generates energy required to eject liquid, (2) a first protection layer that blocks contact between the conversion element and the liquid, (3) a second protection layer that partially covers the first protection layer and functions as a first electrode, (4) a second electrode that is electrically connected to the first electrode via the liquid, and (5) an ejection port that ejects the liquid, (B) a control unit configured to control a potential difference between the first electrode and the second electrode in printing to a predetermined value by changing at least one of potentials of the first electrode and the second electrode, wherein the control unit is capable of setting the potential difference for each of the element boards, (C) a count unit configured to count the number of ejected droplets of the liquid for each of the element boards, (D) a deriving unit configured to derive a difference in the number of ejected droplets between the element board with the largest number of ejected droplets and each of the element boards other than the element board with the largest number of ejected droplets, and (E) a determination unit configured to determine whether or not the difference in the number of ejected droplets is equal to or larger than a predetermined threshold for all of the element boards other than the element board with the largest number of ejected droplets, the control method comprising:

causing the control unit to set the potential difference based on at least one of a condition and a configuration of the liquid ejection head, wherein the causing comprises causing the control unit to set the potential of the second electrode to a value obtained by performing subtraction on a current value, for the element board for which a determination result provided by the determination unit is true.

* * * * *